United States Patent [19]
Gardner et al.

[11] Patent Number: 5,848,105
[45] Date of Patent: Dec. 8, 1998

[54] GMSK SIGNAL PROCESSORS FOR IMPROVED COMMUNICATIONS CAPACITY AND QUALITY

[76] Inventors: William A. Gardner, 6950 Yount St.; Stephan V. Schell, 1990 Yountville Cross Rd., both of Yountville, Calif. 94599

[21] Appl. No.: 729,625

[22] Filed: Oct. 10, 1996

[51] Int. Cl.$^6$ .................................................. H03D 3/00
[52] U.S. Cl. ....................... 375/336; 375/350; 375/346; 364/572; 364/574; 370/478
[58] Field of Search .................................. 375/854, 274, 375/278, 334, 336, 346, 350; 364/572, 574, 581; 370/464, 465, 478

[56] References Cited

U.S. PATENT DOCUMENTS

| | | | |
|---|---|---|---|
| 5,255,210 | 10/1993 | Gardner et al. | 364/574 |
| 5,260,968 | 11/1993 | Gardner et al. | 375/200 |
| 5,299,148 | 3/1994 | Gardner et al. | 364/574 |
| 5,465,413 | 11/1995 | Enge et al. | 375/349 |
| 5,487,091 | 1/1996 | Jasper et al. | 375/347 |
| 5,515,378 | 5/1996 | Roy, III et al. | 370/334 |

OTHER PUBLICATIONS

Mendoza et al., "Interference Rejection Using the Time–Dependent Constant Modulus Algorithm (CMA) and the Hybrid CMA/Spectral Correlation Discriminator", IEEE Transactions on Signal Processing, vol. 39, No. 9, pp. 2108–2111, Sep. 1991.

Mendoza et al., "Interference Rejection Using Time–Dependent Constant Modulous Algorithms", Twenty–Third Asilomar Conference on Signals, Systems & Computers, pp. 273–278, Oct. 1989.

Mendoza et al., "Interference Rejection Using a Hybrid of a Constant Modulus Algorithm and the Special Correlation Discriminator", Proceedings of MILCOM 89, pp. III:491–497, Oct. 1989.

Greene et al., "An Optimal Receiver Using a Time–Dependent Adaptive Filter", Proceedings of MILCOM 89, pp. III:650–656, Oct. 1989.

Reed et al., "A Frequency Domain Time–Dependent Adaptive Filter for Interference Rejection", Proceedings of MILCOM 88, pp. II:391–397, Oct. 1988.

Widrow et al., "Adaptive Signal Processing", Prentice–Hall, pp. 15–22, 1985.

Treichler et al., "A New Approach to Multipath Correction of Constant Modulus Signals", IEEE Transaction on Acoustics, Speech, and Signal Processing, vol. ASSP–31, No. 2, pp. 459–472, Apr. 1983.

Treichler et al., "New Processing Techniques Based on the Constant Modulus Algorithm", IEEE Transactions on Acoustics, Speech, and Signal Processing, vol. ASSP–33, No. 2, pp. 420–431, Apr. 1985.

Gooch et al., "The CM Array: An Adaptive Beamformer for Constant Modulus Signals", Proceedings of ICASSP 86, pp. 2423–2526, Apr. 1986.

(List continued on next page.)

*Primary Examiner*—Jason Chan
*Assistant Examiner*—Congvan Tran
*Attorney, Agent, or Firm*—John P. O'Banion

[57] ABSTRACT

A method and apparatus for separating and removing distortion from interfering co-channel signals and suppressing adjacent-channel interfering signals of the Gaussian Minimum-Shift Keyed (GMSK) or other MSK type with filtering structures that exploit the cyclostationarity of the received GMSK or other MSK signals in order to accommodate a greater number (or the same number, but with greater quality) of transmitted signals received by one or more antennas than can be accommodated by existing filters. The parameters in these filtering structures are adapted by either of two adaptation apparatus that exploit both the known training sequence that is transmitted in most wireless communications systems, and the constant modulus property exhibited by each of the transmitted GMSK or other MSK signals.

12 Claims, 31 Drawing Sheets

OTHER PUBLICATIONS

Shynk et al., "Convergence Properties of the Multistage CMA Adaptive Beamformer", Proceedings of the Twenty–Seventh Asilomar Conference on Signals, Systems & Computers, pp. 622–626, Nov. 1993.

Schmidt, R., "Multiple Emitter Location and Signal Parameter Estimation", IEEE Transactions on Antennas Propagation, vol. AP–34, No. 3, pp. 276–280, Mar. 1986.

Viberg et al., "Detection and Estimation in Sensor Arrays Using Weighted Subspace Fitting", IEEE Signal Processing, vol. 39, No. 11, pp. 2436–2449, Nov. 1991.

Gardner, W.A., "Statistical Spectral Analysis: A Nonprobabilistic Theory", Prentice–Hall Information and System Sciences, pp. 481–488, 1987.

Brown, W.A., "On the Theory of Cyclostationary Signals", PhD thesis, University of California, Davis, pp. 70–102, Sep. 1987.

Reed, J.H., "Time–Dependent Adaptive Filters for Interference Rejection", PhD thesis, University of California, Davis, pp. 100–133, Dec. 1987.

Gardner et al., "Frequency–Shift Filtering Theory for Adaptive Co–Channel Interference Removal", Proceedings of the Twenty–Third Asilomar Conference on Signals, Systems & Computers, pp. 562–567, Nov. 1989.

Gardner et al., Performance of Optimum and Adaptive Frequency–Shift Filters for Cochannel Interference and Fading, Proceedings of the Twenty–Fourth Asilomar Conference on Signals, Systems & Computers, pp. 242–247, Nov. 1990.

Reed et al., "The Performance of Time–Dependent Adaptive Filters for Interference Rejection", IEEE Transactions on Acoustics, Speech, and Signal Processing, vol. 38, pp. 1373–1385, Aug. 1990.

Petrus et al., "Time Dependent Adaptive Arrays", IEEE Signal Processing Letters, vol. 2, No. 12, pp. 219–222, Dec. 1995.

He et al., "Spectral Correlation of AMPS Signals andits Application to Interference Rejection", Proceedings of MILCOM 1994, pp. III:1007–1011, Oct. 1994.

Reed et al., "An Optimal Receiver Using a Time–Dependent adaptive Filter", IEEE Transactions on Communications, vol. 42, No. 2/3/4, pp. 187–190, Feb.–Apr. 1995.

Aue et al., "An Interference Robust CDMA Demodulator That Uses Spectral Correlation Properties", Proceedings of IEEE 44th Vehicular Technology Conference, pp. 563–567, Jun. 1994.

Reed et al., "The Theoretical Performance of Optimal Time–Dependent Filters for Co–Channel Interference Rejection", Proceedings of MILCOM 90, pp. III:961–965, Sep. 1990.

Gardner, William A., "Cyclic Weiner Filtering: Theory and Method", IEEE Transactions on Communications, vol. 41. No. 1, Jan. 1993, pp. 151–163.

Hendessi F. et al., "The Structure and Performance of Fresh–Decision Feedback Equalizer in the Presence of Adjacent Channel Interference", Proceedings of the 1993 43rd IEEE Vehicular Technology Conference, May 18–20, 1993, pp. 641–644.

Webster, Mark, "Polyspectra–Based, Blind, MMSE, Fractionally–Spaced Equalization of a Cyclostationary Signal", Proceedings of the 1993 IEEE Statistical Signal and Array Processing Conference, Apr. 27–30, 1993, pp. IV–276 to IV–279.

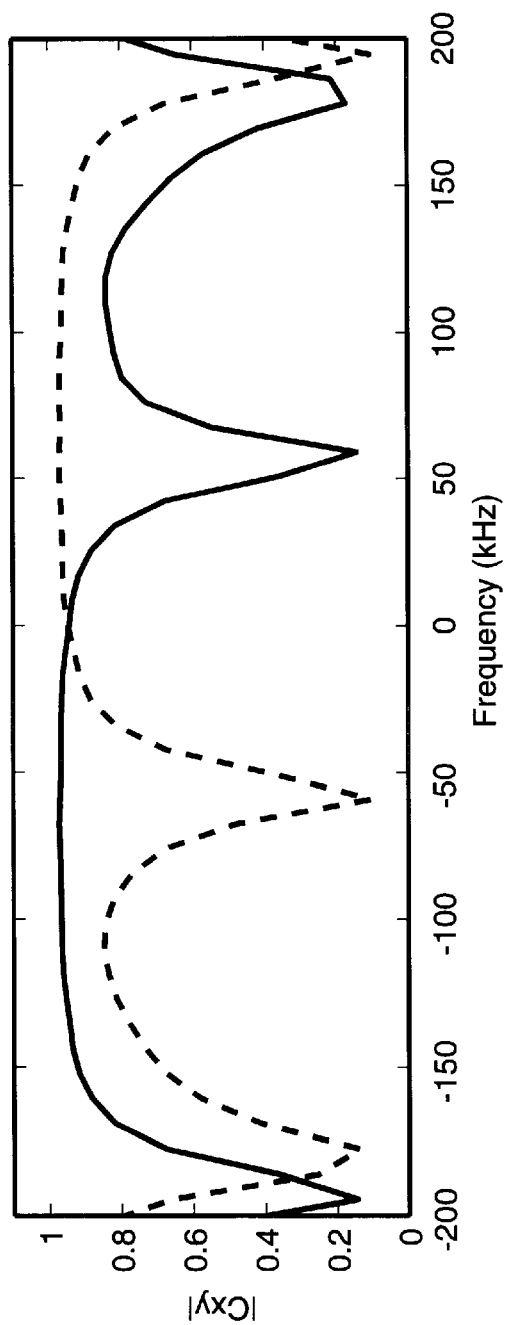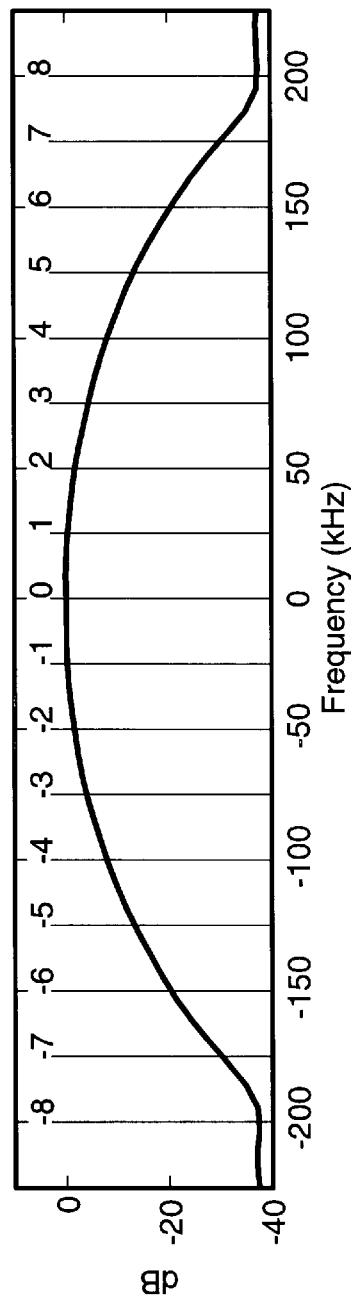

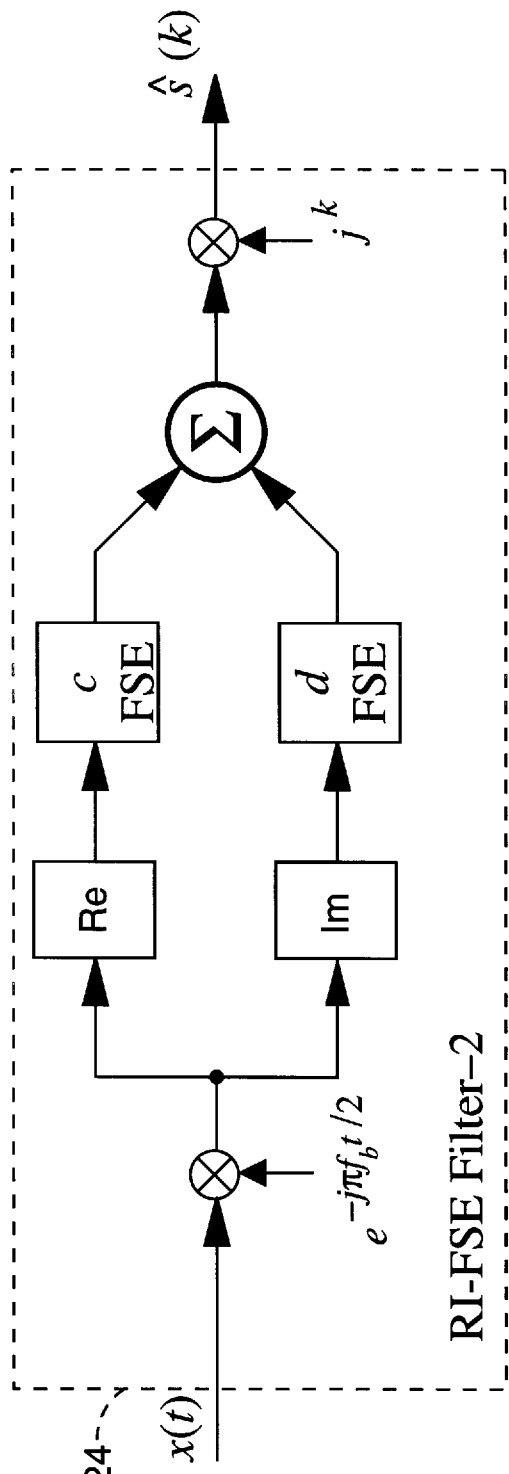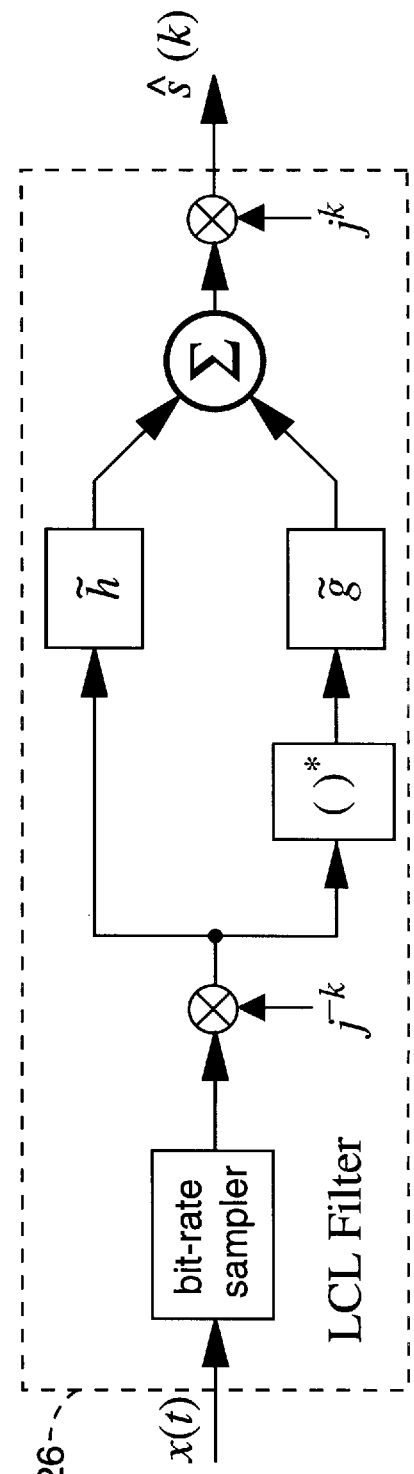
FIG.-11
FIG.-12

FIG. —13

2I-LCL-FRESH-U Filter with Improved Cancellation of Adjacent Channel Interference (Upper Channel)

2I-LCL-FRESH-L Filter with Improved Cancellation of Adjacent Channel Interference (Lower Channel)

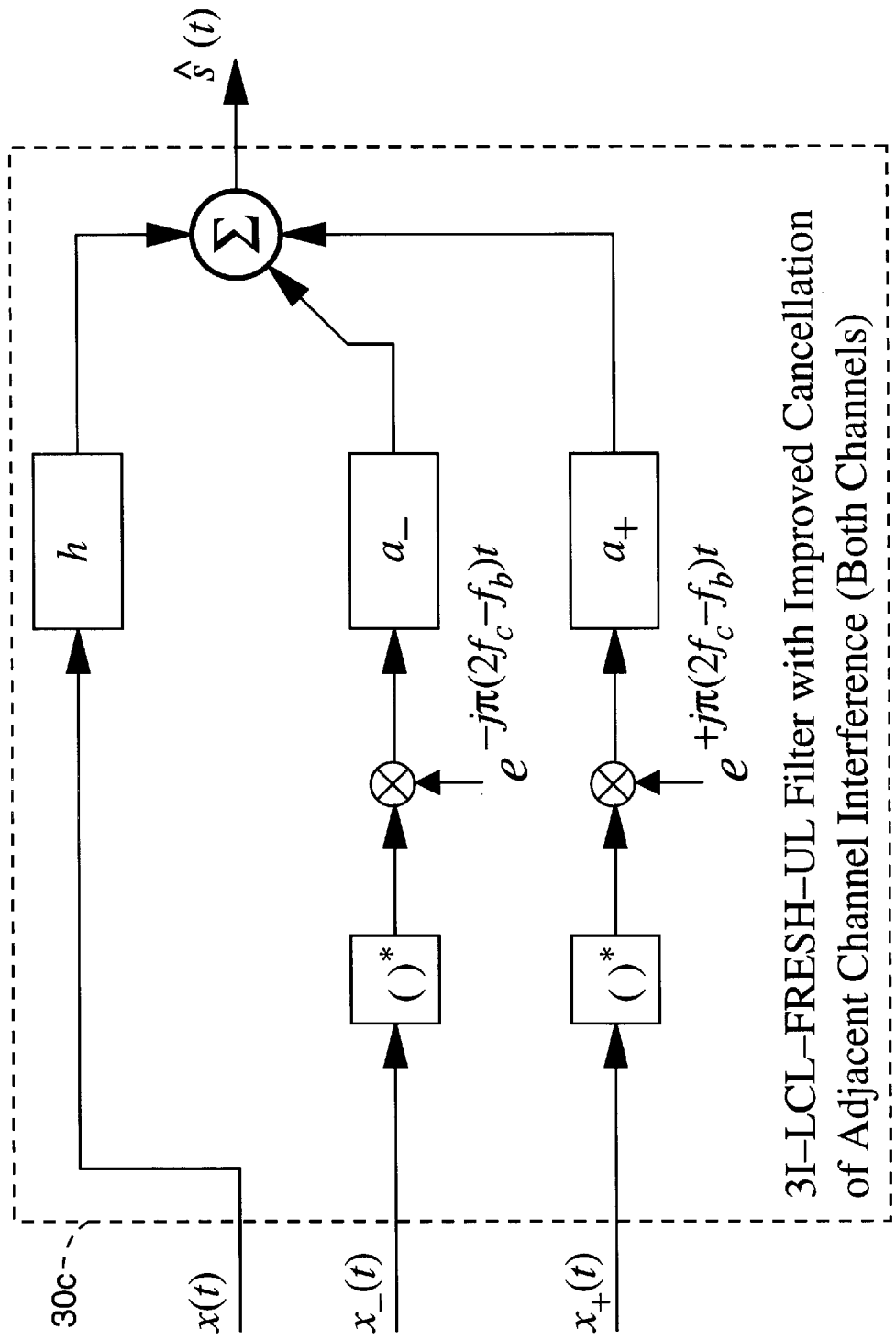
FIG. −17
3I-LCL-FRESH-UL Filter with Improved Cancellation of Adjacent Channel Interference (Both Channels)

FIG. — 24

GMSK SIGNAL PROCESSORS FOR IMPROVED COMMUNICATIONS CAPACITY AND QUALITY

BACKGROUND OF THE INVENTION

1. Field of the Invention

The present invention pertains generally to reducing interference in wireless communications systems using Gaussian Minimum Shift Keyed (GMSK) or other Minimum Shift Keyed (MSK) signals, and more specifically to a method and apparatus for (i) rejecting interfering signals received at a communications receiver and occupying the same or adjacent spectral band as one or more desired signals, (ii) separating, if needed, multiple desired communication signals received at a communications receiver, and (iii) correcting distortion that affects one or more desired communication signals received at a communications receiver such as that caused by a multipath radio-frequency (RF) propagation channel.

2. Description of the Background Art

The background of the present invention falls into two general categories: (i) work pertaining to the filtering structures that perform interference rejection, signal separation, and distortion correction; and (ii) work pertaining to the adaptive algorithms that adjust the coefficients in these filtering structures to allow them to operate in signal environments that are endemic to mobile, portable, and personal wireless communication systems. This work, however, differs substantially from the present invention.

A. Filtering Structures

With the exception of the single-sensor FRESH filter and the Joint Maximum Likelihood Sequence Estimator, all prior work on interference rejection and signal separation that could be applied to a system that receives multiple GMSK or MSK signals in the same spectral band and time interval requires that multiple sensors (antennas) be used. Another requirement of this body of work is that the spatial characteristics of any two signals received by the multiple sensors must be sufficiently different; if this requirement is not met (or is poorly met) then the filtering structure will not be able to reject the interference and separate the desired signals (or will do so with poor quality). This body of work includes all filtering structures that belong to the class of linear time-invariant (LTI) spatio-temporal filters; this class of filters is defined by the fact that their outputs can be modeled mathematically as sums of amplitude-scaled, phase-shifted, and time-shifted versions of the output signals of the multiple sensors. Notably, this class of filters characterizes virtually all filtering structures that have been previously developed to address the problem (and problems similar to it) solved by the present invention.

With regard to the single-sensor FRESH filter, none of the prior works (i) discuss or describe application of FRESH filtering to GMSK or other MSK signal types, (ii) discuss or describe application to GSM or DECT standards, (iii) suggest using frequency shifts equal to plus or minus one-half the bit rate of a signal or equal to two times the carrier frequency plus or minus one-half the bit rate, (iv) show a 3-path LCL-FRESH structure relevant to multiple GMSK signals with equal carrier frequencies and bit rates which (for complex envelope with zero carrier offset) contains no unconjugated frequency-shifted paths, (v) show a 2-path, 2-input LCL-FRESH structure relevant to adjacent-channel GMSK interference, (vi) show a 3-path, 3-input LCL-FRESH structure relevant to adjacent-channel GMSK interference, (vii) show a multi-sensor 3-path LCL-FRESH structure comprising one each of identical versions of a 2-path or 3-path LCL-FRESH structure at the output of each sensor with all 2-path LCL-FRESH filter outputs summed, (viii) describe any partially blind methods for adaptation of any filter to separate GMSK or MSK signals, (ix) describe any training-aided constant modulus algorithm (CMA) methods for adaptation for any signal type, (x) demonstrate separability of any GMSK or MSK signals using any FRESH filtering method, (xi) describe the theoretical spectral redundancy properties of GMSK that provide for signal separability using FRESH filtering, or (xii) show the measured spectral redundancy properties of GMSK signals. Furthermore, the single-sensor FRESH filter has a severe limitation that is transcended by the present invention: it cannot accommodate multiple sensors in any way that allows it to reject and/or separate more than 2 co-channel and 2 adjacent-channel GMSK or MSK signals, in contrast to the present invention.

Although a Joint Maximum Likelihood Sequence Estimator (JMLSE) operating with a single sensor may theoretically have the ability to reject and/or separate more than 2 GMSK or MSK signals, the quality of the separated signals must degrade substantially when the number of these exceeds two. Furthermore, the computational complexity of the JMLSE is extremely high and is not practical to implement in real-time without expensive hardware that draws copious amounts of electrical energy. These drawbacks become more severe (at an exponential rate) as the number of sensors to be accommodated increases beyond one and the number of signals to be jointly separated increases.

The filtering structures of the present invention do not suffer from the severe implementational drawbacks of the JMLSE; they accommodate single or multiple sensors to great advantage; and they can reject and/or separate multiple signals even when one or more pairs of these signals cannot be rejected and/or separated by the LTI spatio-temporal filters. More specifically, the filtering structures of the present invention provide capabilities, for rejecting interfering signals and separating desired signals and correcting their distortion, that are not provided by any prior filtering structures.

B. Adaptation Methods

The filtering structures used in this invention, and in other means and apparatus for interference rejection, signal separation, and correction of distortion are controlled through the selection of values of filter parameters or coefficients. In some embodiments of these filtering structures, these coefficients can include the gains and phases used to weight various signals prior to summing. In typical wireless communication systems, the values of these coefficients must vary properly because the spatio-temporal characteristics of the received signals vary in time. That is, the values of the coefficients of these filtering structures must be chosen adaptively.

With the exception of the present invention, there are two classes of methods for adaptively choosing these coefficient values: (i) conventional methods that rely exclusively on the knowledge of training sequences embedded in the desired signals, this knowledge being used to choose an initial setting for the coefficient values, typically according to a least-squared error criterion; and (ii) blind methods that do not use embedded training sequences but instead exploit one or more properties of the interference or of the desired signals.

Conventional methods that use a known training signal are well-known to those skilled in the art of signal processing, and are described in the open literature pertaining to adaptive signal processing and adaptive filtering. Conventional methods are limited in their applicability, however, because the number of coefficient values that they can adapt successfully must be less (much less for good performance) than the number of known samples within the embedded training sequence. This number of known samples is fixed by the wireless communication system (e.g., for all signals in GSM that convey voice traffic, this number is the product of 26 and the number of effectively independent samples per bit (which is typically 2) used in the digitization of the continuous-time received signals, assuming a discrete-time implementation). With regard to the problem addressed by the present invention, in which the filtering structures can have, potentially, a large number of adjustable coefficients, the number of known samples within the embedded training sequence can be insufficient to provide a useful initial setting. A filtering structure initialized in this way would not provide sufficiently high quality estimates of the desired signals to be useful in the communications system.

In contrast, blind methods can make use of the entire record of the received signals over which the spatio-temporal characteristics (i.e., angles of arrival, relative delays, and relative phases of the multiple propagation paths of the multiple signals, and carrier and bit phases of the transmitted signals) are approximately constant. This circumvents the limit imposed by conventional methods on the number of filter coefficients that can be adapted. However, the various blind methods have other severe drawbacks that prevent them from operating successfully in many situations, including the one addressed by the present invention. Specifically, the class of Constant Modulus Algorithms (CMA) and related methods can require much longer data records, to converge to a high-quality solution, than are available. Furthermore, their convergence to a solution is not guaranteed, leading to a confusion between interfering signals (which should be rejected) and desired signals (which should be separated from each other and from the interference). Another class of blind methods relies on estimating the directions of arrival of the received signals; these estimates are then used in a table lookup (through the array manifold, which is a table of calibration data for the multiple-sensor receiver) to find the coefficients of an LTI spatio-temporal filter. However, these so-called direction-finding methods tend to perform poorly in the presence of severe multipath, unknown number of signals, and unknown interference and noise fields, these three impairments being endemic to the wireless communication systems of interest in the present invention.

Furthermore, the direction-finding methods do not provide the types of parameter estimates that are needed to adapt the filtering structures of the present invention.

The adaptation methods of the present invention exploit in a novel manner both the embedded training sequences and the constant modulus property of the desired signals, and in doing so circumvent the undesirable aspects of the conventional methods and of the blind methods. That is, the adaptation methods of the present invention, which choose the values of coefficients in filtering structures, such as those of the present invention, provide capabilities that are not provided by prior adaptation methods.

SUMMARY OF THE INVENTION

The present invention provides a method and apparatus for rejecting undesired interference and separating and correcting the distortion of desired interfering signals of the Gaussian Minimum Shift Keyed (GMSK) or other Minimum Shift Keyed (MSK) type, which arise for example in wireless communication systems based on either the Digital European Cordless Telecommunications (DECT) standard or the Global System for Mobile Communications (GSM) standard and, as a result, improving the quality and quantity of service offered by a wireless communications system that uses GMSK or other MSK signals.

The utility of the present invention may be appreciated, for example but not exclusively, by manufacturers of wireless communications equipment and providers of wireless communications services who wish to improve the quality of communications offered to users of their systems, and/or who wish to increase the number of users of their systems (e.g., to increase revenue in a commercially operated system).

Quantity of service improves when a base station is able to support a greater number of users for a fixed frequency allocation by, for example, being able to reduce frequency reuse distance, extend range, possibly reuse frequencies within a cell, and more frequently assign users to adjacent channels. Quality of service improves, for example, when requests made to a central coordinator (hereafter referred to as the base station) by users to initiate calls are rejected less frequently (i.e., blocking probability is reduced), when calls in progress by mobile users are not abnormally terminated (i.e., probability of dropped calls is reduced), and when the intelligibility of the voice messages in the call is better (i.e., the parties to the call hear less noise, interference, abnormal silences, and the like).

The present invention addresses these general problems by means of a method and apparatus that perform the following functions: (1) rejection of interfering signals received at a communications receiver and occupying the same (or adjacent) spectral band as one or more desired signals, (2) separation (if needed) of multiple desired communication signals received at a communications receiver, and (3) correction of distortion that affects one or more desired communication signals received at a communications receiver (e.g., distortion caused by a multipath radio-frequency (RF) propagation channel).

Accordingly, an object of the invention is to provide an array of one or more antennas whose outputs are processed by conventional RF front-ends and are then processed by a filtering structure that rejects interference, separates one or more desired signals, and corrects distortion to obtain high-quality estimates of desired signals.

Another object of the invention is to provide a class of filtering structures that can reject interfering signals, separate one or more desired signals, and correct the distortion in these desired signals.

Another object of the invention is to provide a class of filtering structures that can operate on the outputs of any number of antennas after these outputs are downconverted by conventional RF front-ends, including the special case when only one antenna is used.

Another object of the invention is to provide a linear-conjugate-linear (LCL) frequency-shift (FRESH) filter that uses the particular pattern of frequency-shifts and conjugations to exploit the cyclostationarity properties that are characteristic of GMSK and other MSK signals, thereby providing the desired interference-rejection, signal-separation, and distortion-correction capabilities.

Another aspect of the invention is to provide a linear-conjugate-linear polyperiodically time-variant (LCL-PTV)

filter that uses the particular pattern of conjugations and time-variant filter coefficients to exploit the cyclostationarity properties that are characteristic of GMSK and other MSK signals, thereby providing the desired interference-rejection, signal-separation, and distortion-correction capabilities.

Another object of the invention is to provide an LCL-FRESH fractionally-spaced equalizer (LCL-FRESH-FSE) that operates on higher-than-bit-rate-sampled data to provide bit-rate-sampled output and uses the particular pattern of frequency-shifts and conjugations to exploit the cyclostationarity properties that are characteristic of GMSK and other MSK signals, thereby providing the desired interference-rejection, signal-separation, and distortion-correction capabilities.

Another object of the invention is to provide an LCL-FSE filter that operates on higher-than-bit-rate-sampled and frequency-shifted (by one-fourth of the bit rate) data and uses the sum of FSE processed data and conjugated data to exploit the cyclostationarity properties that are characteristic of GMSK and other MSK signals, thereby providing the desired interference-rejection, signal-separation, and distortion-correction capabilities.

Another object of the invention is to provide a real-imaginary (RI-FSE) filter that provides a computationally efficient alternate embodiment of the LCL-FSE filter.

Another object of the invention is to provide an LCL filter that operates on bit-rate-sampled and frequency-shifted (by one-fourth of the bit rate) data and uses the sum of linearly filtered data and conjugated data to exploit cyclostationarity properties that are characteristic of GMSK and other MSK signals, thereby providing the desired interference-rejection, signal-separation, and distortion-correction capabilities.

Another object of the invention is to provide a real-imaginary (RI) filter that provides a computationally efficient alternate embodiment of the LCL filter.

Another object of the invention is to provide a class of methods for adapting the adjustable coefficients in any of the filtering structures of this invention so that the filter can properly perform the functions of rejecting interference, separating one or more desired signals, and correcting distortion.

Another aspect of the invention is to provide a means of adapting the adjustable coefficients, by using both the known training sequence(s) embedded in the desired signal(s) and the knowledge that the desired signal(s) have constant modulus, thus providing training-augmented constant-modulus (TACM) adaptation.

Another object of the invention is to provide a means of adapting the adjustable coefficients, by using the known training sequence(s) embedded in the desired signal(s) to constrain adaptation that uses the knowledge that the desired signal(s) have constant modulus, thus providing training-constrained constant-modulus (TCCM) adaptation.

These general aspects and their details give this invention significant capabilities of great utility in wireless communication systems. The capability provided by this invention can be used to improve the quality and quantity of communication services provided by such systems. The quality of service can be improved by using the invention to suppress interference in a particular frequency band and time slot jointly referred to as a channel) and spatial cell caused by other users in the same or adjacent channels and in the same or adjacent spatial cells and to correct signal distortion; and the quantity of service can be increased by reallocating channels in a manner that intentionally results in more interfering, but separable by this invention, signals per channel and cell, in order to accommodate more users.

These improvements are made possible by this invention because this invention, using only one sensor, can separate multiple spectrally overlapping signals of certain types and can correct even severe frequency-selective fading and other distortion and, because the number of such signals that can be separated and corrected by this invention, using multiple sensors increases proportionately with the number of sensors. In cellular communication systems that use base stations, the allocation of channels can (but need not) be made so that the introduced interference occurs only in up-link channels (from mobile units to base stations) so that the invention need only be implemented in the base station receivers and not in the mobile receivers. The invention can also be used at base stations (or at mobile units, or both) using only a single receiving antenna or multiple antennas.

With reference to the specific example of GMSK and other MSK signals, between 2 and 4 GMSK and other MSK signals in a single channel can be accommodated with one antenna, depending on how many signals arise from users in the same channel and how many arise from adjacent channels. More generally, with a number M of antennas, between 2M and 4M signals can be accommodated.

Further objects and advantages of the invention will be brought out in the following portions of the specification, wherein the detailed description is for the purpose of fully disclosing preferred embodiments of the invention without placing limitations thereon.

BRIEF DESCRIPTION OF THE DRAWINGS

The invention will be more fully understood by reference to the following drawings which are for illustrative purposes only:

FIG. 1 is a graph showing the cross-coherence functions of a sample GMSK signal and its conjugated and frequency-shifted versions.

FIG. 2A is a graph showing the spectral content of a GMSK (0.3) signal, x(t).

FIG. 11 is a functional block diagram of a "type2" RI-FSE filter in accordance with the present invention for performing interference rejection and/or co-channel separation and/or distortion correction for GMSK or other MSK signals.

FIG. 12 is a functional block diagram of an LCL filter in accordance with the present invention for performing interference rejection and/or co-channel separation and/or distortion for GMSK or other MSK signals.

FIG. 17 is a functional block diagram of a 3-input, 3-path LCL-FRESH filter in accordance with the present invention for canceling both adjacent upper and adjacent lower channel interference.

DESCRIPTION OF THE PREFERRED EMBODIMENTS

Figure 2B:
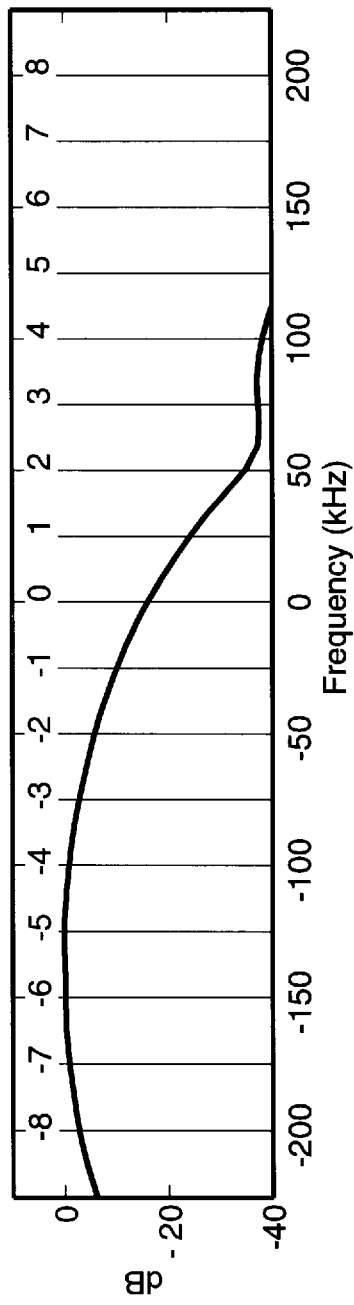
FIG. 2B is a graph showing the spectral content of a conjugated and frequency shifted version of the signal shown in FIG. 2A, $y_1(t)=x^*(t)e^{-j\pi f_b t}$.

Referring more specifically to the drawings, for illustrative purposes the present invention is generally shown with reference to FIG. 1 through FIG. 36 where like reference numerals denote like parts. It will be appreciated that the apparatus may vary as to configuration and as to details of the parts and that the method may vary as to the steps and their sequence without departing from the basic concepts as disclosed herein.

A. Filtering Structures and Their Theoretical Foundations

The filtering structures of the present invention exploit the 100% spectral redundancy exhibited by GMSK and other MSK signals. That is, these filtering structures exploit the fact that information conveyed in one subband of the GMSK or other MSK signal is also conveyed in another subband. In fact, for any GMSK or other MSK signal, the waveforms in any two such related subbands are nearly perfectly correlated. Thus, this spectral redundancy augments the more widely known and exploited spatial redundancy in which the waveforms due to a given source and received by two different antennas in an array are perfectly correlated.

Just as a receiver without multiple antennas and the spatial filtering structure needed to properly combine their outputs loses out on the well-known performance gains due to the exploitation of spatial redundancy, a receiver without the filter structures of the present invention loses out on the significant performance gains due to the exploitation of spectral redundancy.

By exploiting both spatial redundancy and spectral redundancy (also referred to as spectral correlation), the filtering structures of the present invention provide at least twice the level of processing gain of an LTI spatio-temporal filtering structure. For example, an M-antenna array can separate up to 2M to 4M GMSK or other MSK signals using these filtering structures, or can separate up to the more conventionally attainable number M of GMSK or other MSK signals but can do so with significantly higher reliability and quality than a conventional spatial filter. These capabilities can be explained by reference to the spectral correlation of the GMSK or other MSK signals, and by reference to the relationship between correlation (regardless of its origin or type) and linear filtering.

B. Relationship Between Correlation and Linear Filtering

Although the relationship between correlation and linear filtering is fundamental, it is not widely understood even by those skilled in the art of signal processing. Therefore, for purposes of describing the present invention we will explain this relationship by a simple, although abstract, analogy: if x(t)=a(t)+b(t), and y(t)=c(t)+d(t), where a(t) and c(t) are highly correlated, and where b(t) and d(t) are highly correlated, then an appropriate linear combination of x(t) and y(t) (i.e., the output of an appropriately chosen linear filtering structure applied jointly to x(t) and y(t)) can provide high-quality estimates of one or more of the signals a(t), b(t), c(t), and d(t).

C. Spectral Correlation of GMSK and Other MSK Signals

To understand how such performance can be possible, and to understand what filtering structures are applicable to GMSK and other MSK signals, it is necessary to understand the spectral correlation properties of GMSK and other MSK signals. For this purpose, these properties are best described by the cross-coherence function, which is a frequency-domain cross-correlation coefficient. Specifically, let x(t) denote the complex envelope of a GMSK signal having zero carrier-frequency offset and bit rate $f_b$, and let y(t) be a conjugated and frequency-shifted version of x(t), where the frequency-shift is either $f_b/2$ or $-f_b/2$:

$$y_1(t) = x^*(t)e^{-j2\pi(f_b/2)t} \quad (1)$$

$$y_2(t) = x^*(t)e^{+j2\pi(f_b/2)t} \quad (2)$$

with $y(t)=y_1(t)$ or $y(t)=y_2(t)$. We consider the cross-coherence function $C_{xy}(f)$ defined by $$C_{xy}(f) = \frac{S_{xy}(f)}{\sqrt{S_{xx}(f)S_{yy}(f)}} \quad (3)$$

where $S_{xy}(f)$ denotes the cross spectral density between x(t) and y(t), and $S_{xx}(f)$ and $S_{yy}(f)$ denote the power spectral densities of x(t) and y(t), respectively. The magnitude $|C_{xy}(f)|$ versus frequency $f$ for a GMSK signal is shown in FIG. 1, where the solid line represents $|C_{xy_1}(f)|$ and the dashed line represents $|C_{xy_2}(f)|$, and is clearly very nearly equal to one over the entire frequency channel (−100 kHz to +100 kHz) allocated to the signal.

Figure 2C:
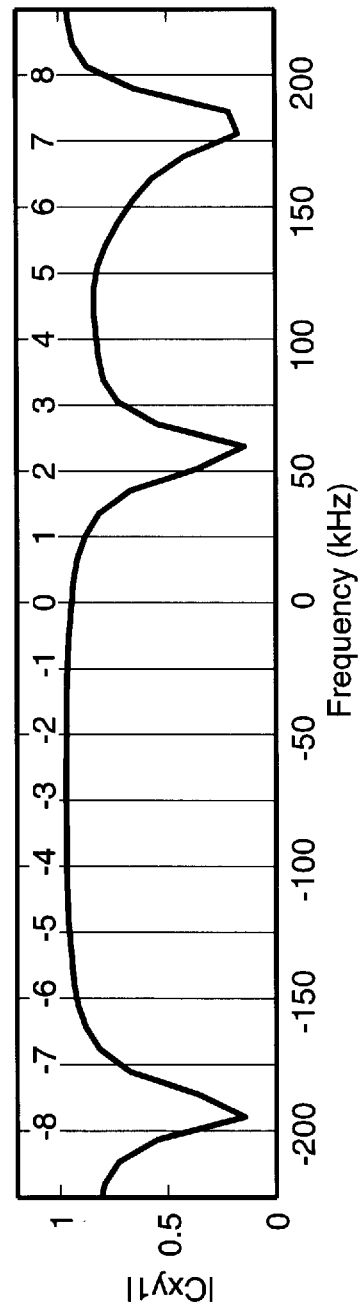
FIG. 2C is a graph showing the spectral density of the degree to which x shown in FIG. 2A and y, shown in FIG. 2B are correlated.
Figure 3A:
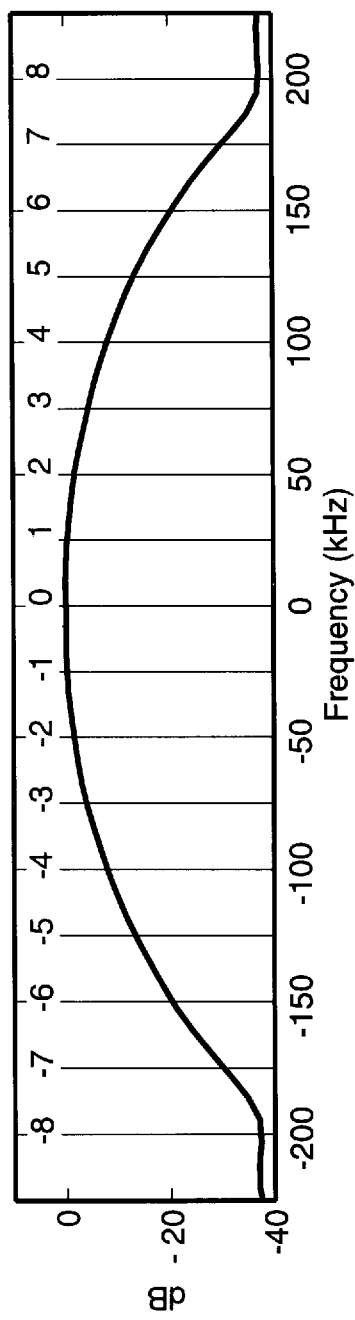
FIG. 3A is a graph showing the spectral content of a GMSK (0.3) signal, x(t).
Figure 3B:
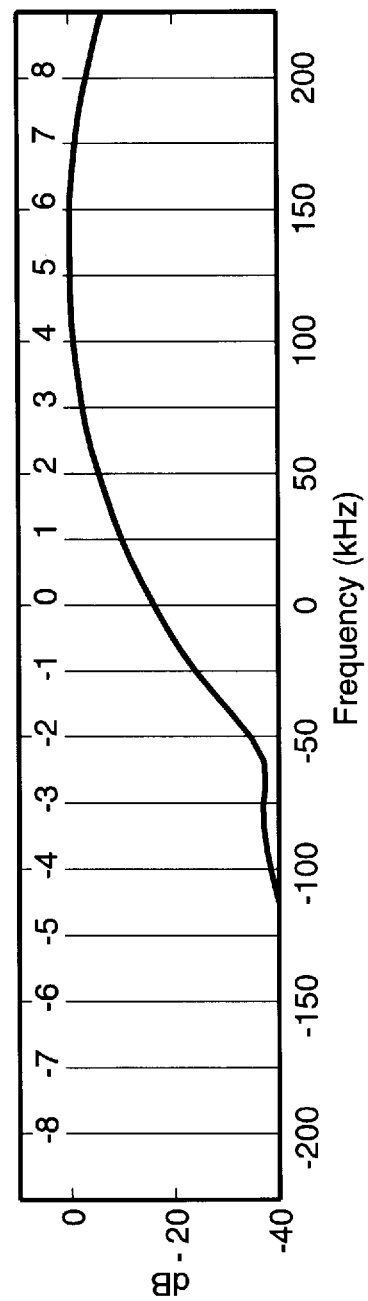
FIG. 3B is a graph showing the spectral content of a conjugated and frequency shifted version of the signal shown in FIG. 3A, $Y_2(t)=x^*(t)e^{j\pi f_b t}$.
Figure 3C:
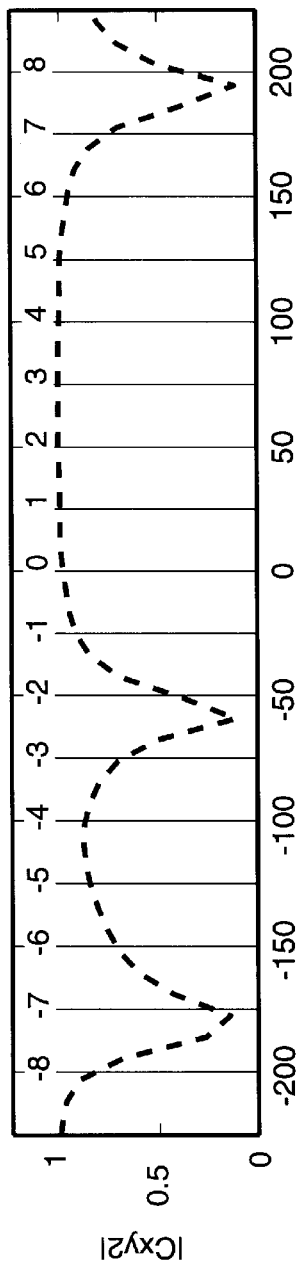
FIG. 3C is a graph showing the spectral density of the degree to which x shown in FIG. 3A and $y_2$ shown in FIG. 3B are correlated.

For any $f$ such that $|C_{xy}(f)|$ is nearly equal to one, the narrowband components of x(t) and y(t) at frequency $f$ fare nearly perfectly correlated. For our definitions of x(t) and y(t), this is equivalent to stating that the narrowband component of x(t) at $f$ and the narrowband component of x*(t) at either $f+f_b/2$ or $f-f_b/2$ are nearly perfectly correlated. Referring to FIG. 2A through FIG. 2C, the fact that $|C_{xy_1}(f)|$ in FIG. 2C is nearly equal to unity for narrowband components numbered −6, −5, . . . ,−1, 0 implies that each pair of like-numbered narrowband components taken from x(t) in FIG. 2A and $y_1(t)=x^*(t)e^{-j\pi f_b t}$ in FIG. 2B are nearly perfectly correlated. The same is true for the continuum of pairs of narrowband components in x(t) and $y_1(t)$ at identical values off Accordingly, an appropriate linear combination of one of these components from x(t) and the corresponding one from $y_1(t)$, can provide the same level of processing gain against other signals, interference, and noise as an appropriate linear combination of the signals received by at least twice as many antennas as used to receive x(t). Similar statements apply to linear combinations involving x(t) and $Y_2(t)=x^*(t)e^{j\pi f_b t}$. Thus, a filtering structure that uses linear combinations of x(t),$y_1(t)$, and $y_2(t)$ can provide the same level of processing gain against other signals, interference, and noise as an appropriate linear combination of the signals received by twice as many antennas as used to receive x(t).

Based on these facts about the spectral correlation properties of GMSK and other MSK signals, two specific interference scenarios are cited here as examples to illustrate, but not to limit, the applicability of the filtering structures of this invention to practical problems in wireless communication systems. For simplicity, only a single antenna is used in both scenarios; the capability of the proposed filtering structures increases proportionately with the number of antennas used.

Co-Channel Interference Rejection

A single antenna receives a desired GMSK signal and a co-channel GMSK signal having the same carrier frequency and comparable signal power. Neither signal can be recovered by a linear time-invariant filtering structure. However, with reference to FIG. 2A through FIG. 2C, each of the components numbered −6 to 0 (and the components in the continuum from −150 kHz to 0 kHz) in x(t) can be linearly combined with its corresponding component in $y_1(t)$ to yield a clean estimate of the desired signal while rejecting the co-channel interference. Similarly, with reference to FIG. 3A through FIG. 3C, each of the components numbered 0 to 6 (and the components in the continuum from 0 to 150 kHz) in x(t) can be linearly combined with its corresponding component in $y_2(t)$ to yield a clean estimate of the desired signal while rejecting the co-channel interference. Thus, by using both $y_1(t)$ and $Y_2(t)$, the desired signal can be recovered over the entire band from −150 kHz to +150 kHz, or over just the allocated GSM frequency channel from −100 kHz to +100 kHz if desired. In this way, the filtering structures in this invention can reject a GMSK co-channel interfering signal even when only one antenna is used.

Adjacent Channel Interference Rejection

A single antenna receives a desired GMSK signal and an adjacent channel GMSK signal possibly having much greater signal power. Specifically, let the adjacent channel signal have a carrier frequency that is 200 kHz (per GSM carrier allocation protocols) less than that of the desired signal. Due to spectral leakage, the adjacent channel interferer degrades the desired signal, which cannot be recovered by a linear time-invariant filtering structure. However, with reference to FIG. 3A through FIG. 3C, each of the components numbered 4 to 8 (and the components in the continuum from 100 kHz to 200 kHz) in the adjacent channel interference (now downconverted to zero carrier offset), which comprise the spectral leakage into the desired signal, can be linearly combined with its corresponding component in $y_1(t)$ to cancel out the effects of the spectral leakage. Similarly, an adjacent channel interferer whose carrier is 200 kHz above that of the desired signal can be canceled out. In this way, the filtering structures in this invention can reject two GMSK, adjacent channel interfering signals even when only one antenna is used.

Signal Distortion Correction

When a transmitted signal undergoes propagation through a non-ideal channel, such as a multipath propagation channel, the received signal can be a severely distorted version of the transmitted signal, including for example frequency-selective fading (i.e., deep spectral nulls). However, with reference to FIG. 2A through FIG. 2C, any of the narrowband components numbered $-6, -5, \ldots -1, 0$ (and the components in the continuum from $-150$ kHz to 0 kHz) in $x(t)$ that have been severely attenuated by frequency-selective fading (to such an extent that they cannot simply be amplified without strongly increasing the noise level), can be replaced with corresponding properly phase-adjusted and amplitude-scaled components in $y_1(t)$, thereby removing the spectral nulls. Similarly, with reference to FIG. 3A through FIG. 3C, spectral nulls in the band from 0 kHz to $+150$ kHz can be removed.

D. Specific Filtering Structures

Various filtering structures in accordance with the present invention will now be described with reference to FIG. 4 through FIG. 17. In the filtering structures depicted therein, all blocks with only a letter inside denote standard linear time-invariant filters (ignoring time variation due only to adaptation), those blocks with a letter followed by (t) denote linear periodically time-variant filters, and those blocks with a letter and FSE denote linear time-invariant fractionally spaced equalizers (filters), all of which are known in the signal processing art. Furthermore, blocks with the symbol ( )* inside denote conjugators, blocks with "Re" inside denote real-part selectors (extractors), and blocks with "Im" inside denote imaginary-part selectors (extractors), each of which operates on a complex signal and each of which is also referred to herein as a polarized switcher. These elements are known to those having ordinary skill in the signal processing art or are as otherwise described herein.

LCL-FRESH Filter

Figure 4:
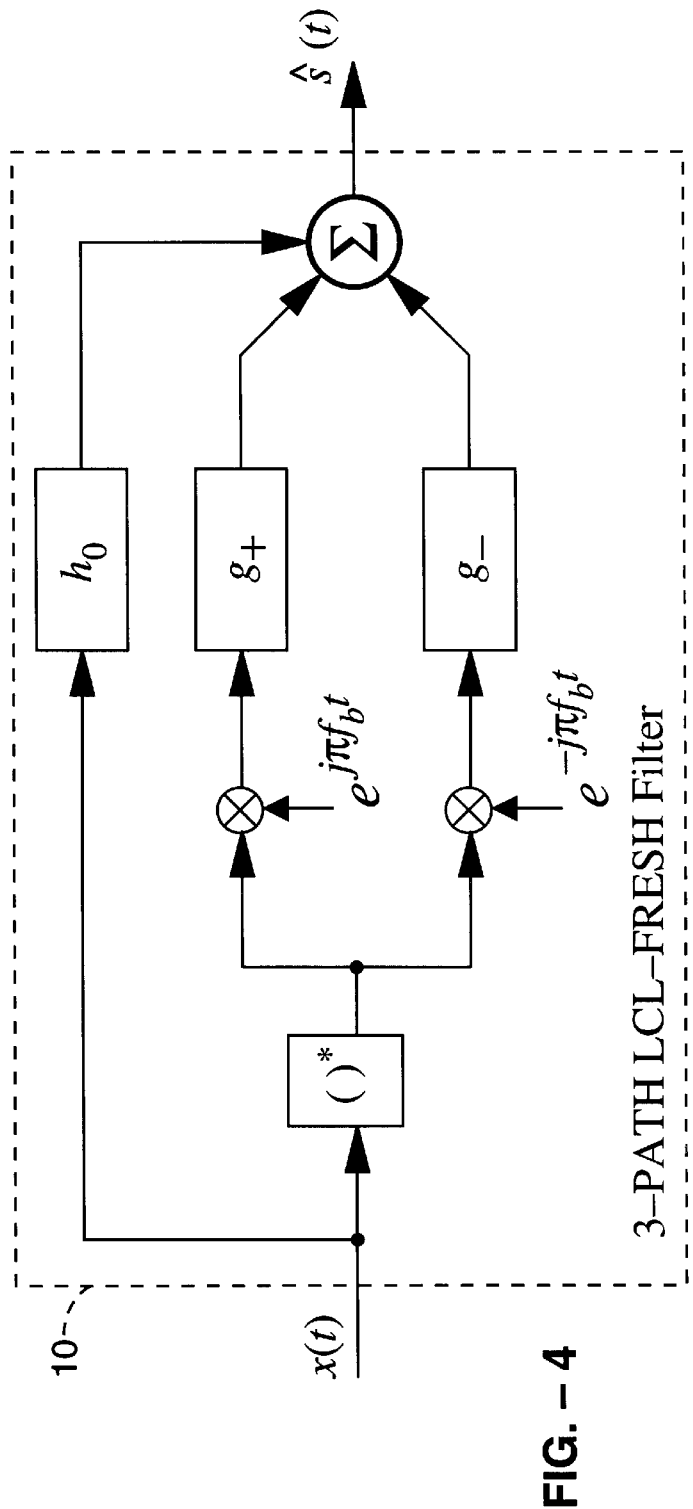
FIG. 4 is a functional block diagram of a 3-path LCL-FRESH filter in accordance with the present invention for performing interference rejection and/or co-channel separation and/or distortion correction for GMSK or other MSK signals.

The preceding observations about $|C_{xy}(f)|$ and the role of high or nearly perfect correlation in motivating linear filtering structures are taken into account in the 3-path time-domain linear-conjugate-linear (LCL) frequency-shift filter (FRESH filter) 10 in accordance with the present invention whose structure for GMSK and other MSK signals is depicted in block-diagram form in FIG. 4. When applied to the signal $x(t)$ received at a single antenna, or the other filter structure or the other filter structures described below can separate and/or correct the distortion of two co-channel GMSK or other MSK signals. The 3-path LCL-FRESH filter is appropriate for data that is sampled at a rate higher than the bit rate. Accordingly, the output of the 3-path LCL-FRESH filter must be sampled at the bit rate prior to being processed, for example, by a GMSK demodulator that operates on bit-rate sampled data to recover the bit stream.

LCL-PTV Filter

As an alternative to the 3-path LCL-FRESH filter, the effect of the two complementary frequency shifts $e^{j\pi f_{b}t}$ and $e^{-j\pi f_{b}t}$ and the associated filters $g_{13}$ and $g_{+}$ can be achieved also with a single time-variant filter $g(t)$. The resulting structure is referred to herein as a linear-conjugate-linear periodically time-variant (LCL-PTV) filter 12 shown in block-diagram form in FIG. 5. The filter $g(t)$ has a time-variant impulse response according to the possibly periodic time-variations in the possibly cyclostationary statistics of the received signals. In some applications, it is appropriate for the coefficients of time-variant filter $g(t)$ to vary with frequency $f_b$, in which case there exists a one-to-one mapping between the LCL-PTV filter and the 3-path LCL-FRESH filter. In other applications, such as those in which the time-slot boundaries of the signals do not line up sufficiently well and the length of a time-slot is a non-integer number of bit periods (e.g., as in GSM), the coefficients of filter $g(t)$ must change every time one or more of the received signals encounters a time-slot boundary. The LCL-PTV filter is appropriate for data that is sampled at a rate higher than the bit rate. Accordingly, the output of the LCL-PTV filter must be sampled at the bit rate prior to being processed, for example, by a GMSK demodulator that operates on bit-rate sampled data to recover the bit stream.

LCL-FRESH-FSE Filter

In both the 3-path LCL-FRESH filter and the LCL-PTV filter, the sampling rate of the filter output exceeds the bit-rate (typically for a linear filter processing GMSK, it is an integer multiple of the bit-rate $f_b$, such as $2f_b$), in which case the filter output is typically sampled at the bit-rate prior to being processed by the demodulator (which provides an estimate of the bit stream conveyed in the desired signal). Thus, an alternative to the 3-path LCL FRESH filter is to move this bit-rate sampling operation back through the filtering structure to the extent possible without changing the capability of the filter and to eliminate redundant operations. Alternative embodiments of the resulting filter structure 14 (type-1) and 16 (type2), which are referred to herein as LCL-FRESH fractionally-spaced equalizers (LCL-FRESH-FSE), are depicted in block-diagram form in FIG. 6 and FIG. 7, respectively. This filter differs significantly from the LCL time-invariant filter by its particular use of conjugated signal paths and by its special use of frequency shifts to properly exploit the cyclostationarity properties of the GMSK or other MSK signals. The bit-rate-sampled signal estimate $\hat{s}(k)$ must be processed by a demodulator to recover the bit stream.

LCL-FSE and RI-FSE Filters

Figure 8:
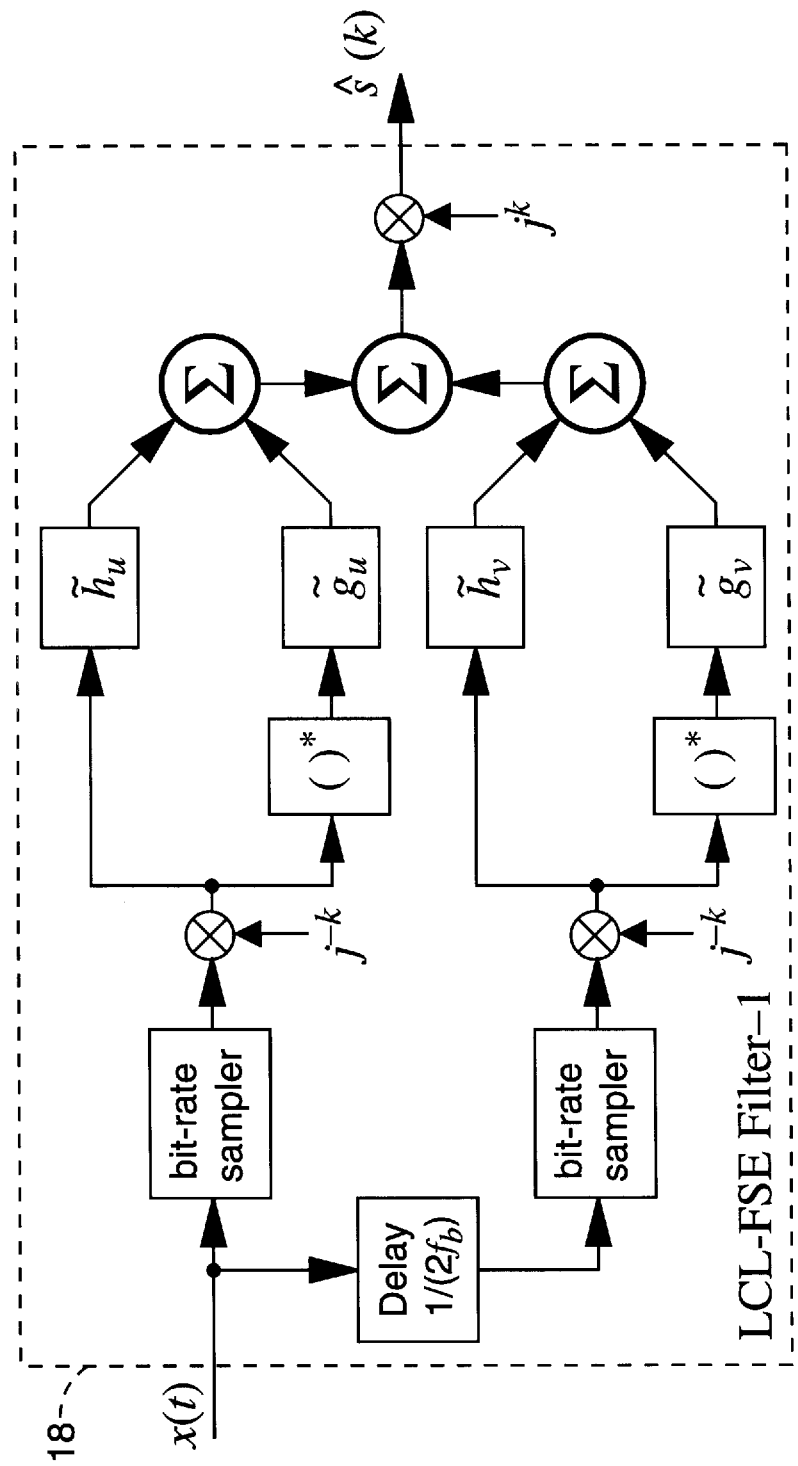
FIG. 8 is a functional block diagram of a "type-1" LCL-FSE filter in accordance with the present invention for performing interference rejection and/or co-channel separation and/or distortion correction for GMSK or other MSK signals.
Figure 9:
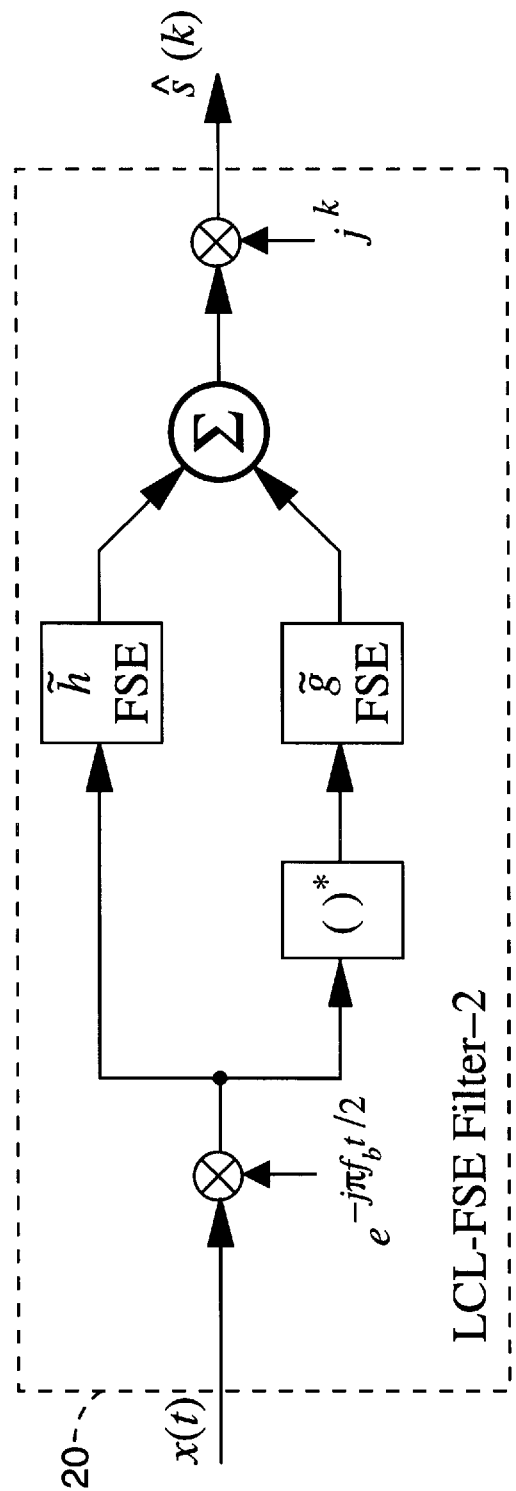
FIG. 9 is a functional block diagram of a "type-2" LCL-FSE filter in accordance with the present invention for performing interference rejection and/or co-channel separation and/or distortion correction for GMSK or other MSK signals.

Straightforward manipulations can be performed on the LCL-FRESH-FSE filter to obtain a filter structure in which the output of each bit-rate-sampler is frequency-shifted by $j^{-k}$. This shifted signal is then split into two paths: the upper path is processed by an LTI filter, and the lower path is conjugated and processed by another LTI filter. That is, the lower path following each bit-rate-sampler no longer contains a frequency shift of $(-1)^k$. However, the output final summer must be frequency-shifted by $j^k$. Alternative embodiments of the resulting filter structure 18 (type-1) and 20 (type2) are shown in FIG. 8 and FIG. 9, respectively. This filter structure will be referred to herein as an LCL-FSE filter rather than an LCL-FRESH-FSE because no path is frequency-shifted any differently than any other path.

The LCL-FSE filter can be simplified without any loss of performance by observing that the two paths at the output of each bit-rate sampler and $j^{-k}$ frequency-shifter form an LCL filter, which can be equivalently realized by modifying the upper path to operate on the real part (instead of operating on the entire complex signal) and by modifying the lower path to operate on the imaginary part (instead of operating on the conjugated complex signal). Since this structure replaces the two LCL filters by two Real-Imaginary (RI) filter pairs, the resulting structure is referred to as the RI-FSE filter and can be interpreted to be an alternate but mathematically equivalent embodiment of the LCL-FSE filter.

Figure 10:
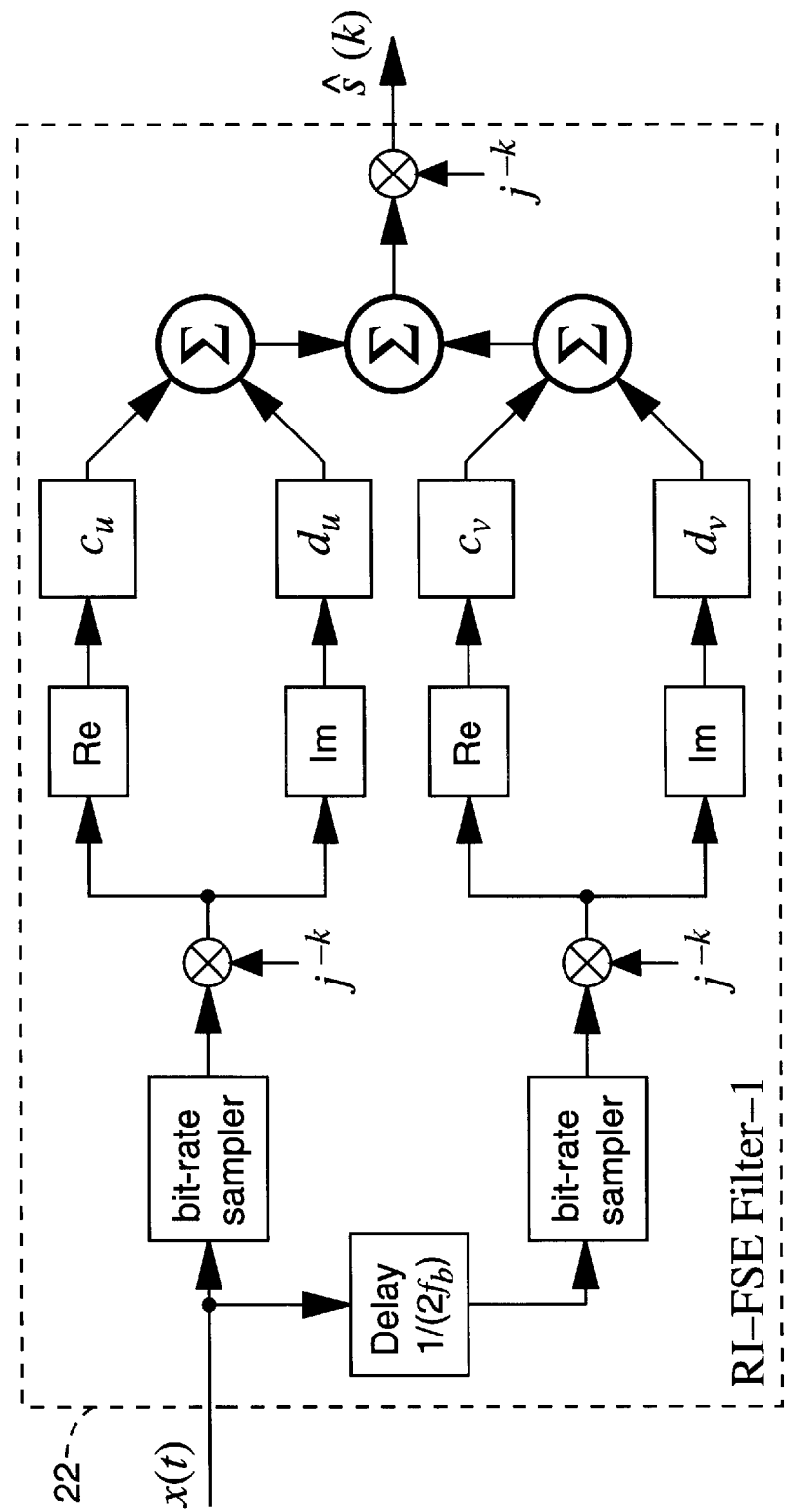
FIG. 10 is a functional block diagram of a "type-1" RI-FSE filter in accordance with the present invention for performing interference rejection and/or co-channel separation and/or distortion correction for GMSK or other MSK signals.

Alternative embodiments of this filter structure, 22 (type-1) and 24 (type-2), are shown in FIG. 10 and FIG. 11, respectively.

LCL and RI Filters

The LCL and RI filters are related to the LCL-FSE and RI-FSE filters, but operate on bit-rate-sampled data. This is possible for GMSK, and for some other MSK signals, because the bit-rate is larger than the RF bandwidth occupied by the signal, and so the bit-rate satisfies Nyquist's sampling criterion for this signal.

The result of simplifying the LCL-FSE filter as a result of the input being sampled at the bit-rate is the LCL filter 26, shown in FIG. 12.

Figure 13:
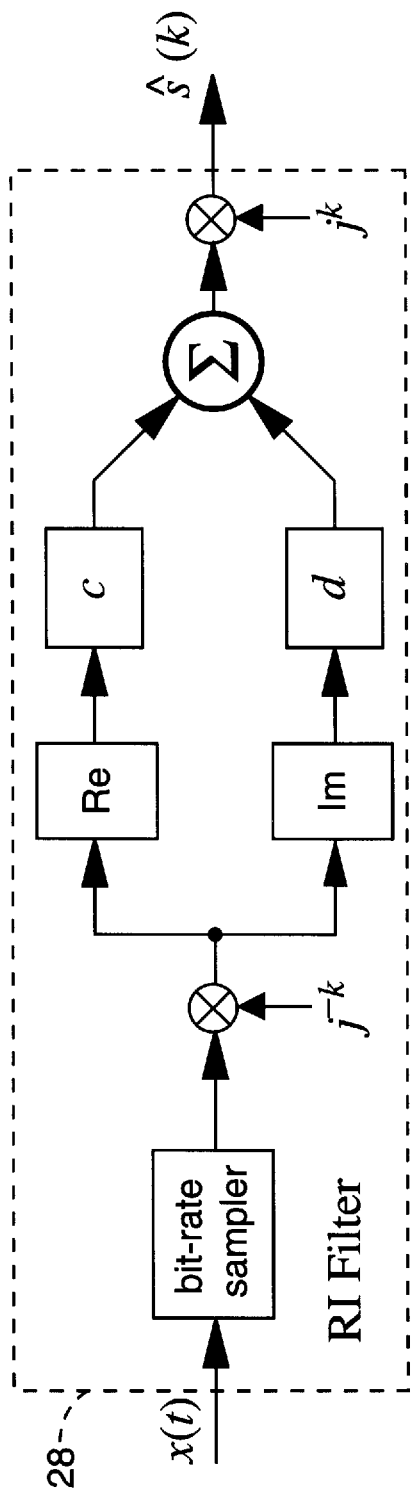
FIG. 13 is a functional block diagram of an RI filter in accordance with the present invention for performing interference rejection and/or co-channel separation and/or distortion correction for GMSK or other MSK signals.

The LCL filter can be simplified without any loss of performance by observing that it can be equivalently realized by modifying the upper path to operate on the real part (instead of operating on the entire complex signal) and by modifying the lower path to operate on the imaginary part (instead of operating on the conjugated complex signal). Since this structure replaces the LCL filter by a Real-Imaginary (RI) filter pair, the resulting structure 28, shown in FIG. 13, is referred to as an RI filter and can be interpreted to be an alternate but mathematically equivalent embodiment of the LCL filter.

The RI filter offers the same implementation advantage over the LCL filter as the RI-FSE offers over the LCL-FSE: since the data paths being processed by various LTI or FSE filters are real, both the application of the filters to the data and the adaptation of the filters require less arithmetic than if the data paths were complex. Significantly, since the RI filter is mathematically equivalent to the LCL filter, there is no loss of quality in the estimated signal at the output.

Time-Variant Versions of LCL-FRESH, LCL-FRESH-FSE, LCL-FSE, RI-FSE, LCL, and RI Although the 3-path LCL-FRESH, LCL-FRESH-FSE, LCL-FSE, RI-FSE, LCL, and RI filters are described herein as if their filter coefficients are fixed over one time-slot, they can in fact be made time-variant (as with the LCL-PTV filter) so as to accommodate the changes in statistical properties of the received signals when, for example, one or more of the signals encounters a time-slot boundary. However, in systems in which there is a high degree of control over the synchronization of the time-slot structures of the multiple co-channel signals, it is advantageous to force the time-slot boundaries of the multiple signals to be as close together as possible. Such desired synchronization could certainly arise if the multiple signals originate from mobile units operating in the same cell in a wireless cellular communication system; similarly, if the multiple signals originate from mobile units operating in different cells, then the desired synchronization could be made to arise through cooperation of the base stations in these different cells.

Variations for Improved Rejection of Adjacent Channel Interference

Figure 14:
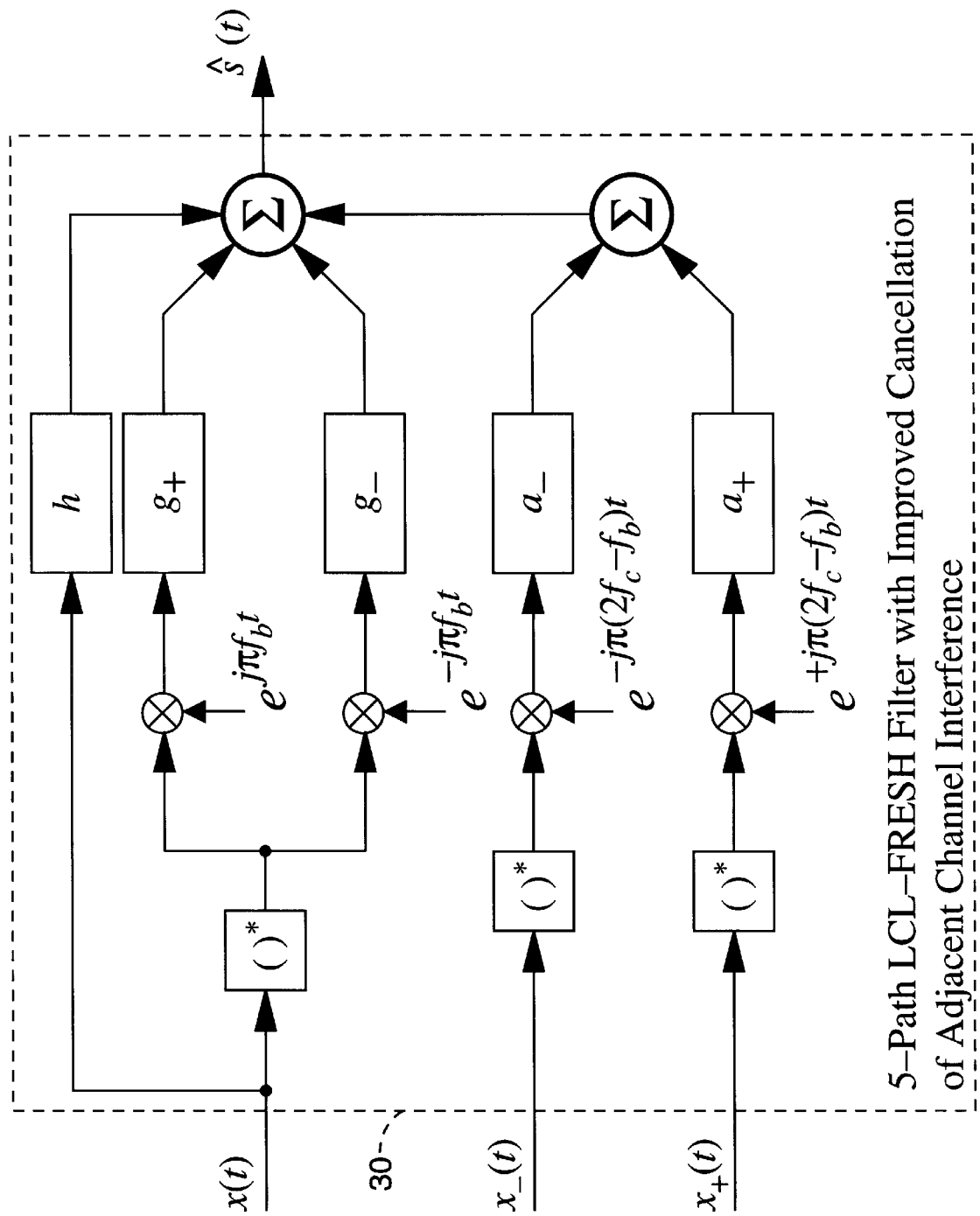
FIG. 14 is a functional block diagram of a 5-path LCL-FRESH filter in accordance with the present invention for performing interference rejection and/or co-channel signal separation and/or distortion correction, with improved cancellation of adjacent channel interference, for GMSK or other MSK signals.

The aforementioned filtering structures are ideally suited for the rejection of co-channel interference and separation of co-channel desired signals and removal of signal distortion. However, variants of these filtering structures can provide rejection of adjacent channel interference by exploiting the spectral correlation properties of the adjacent channel interference in addition to those of the co-channel signals. Capability to reject adjacent channel interference can be especially important when the adjacent channel signals are much stronger than the desired channel signals (e.g., due to the near-far problem). The aforementioned filtering structures can be generalized (or modified) to exploit the cyclostationarity properties of the adjacent channel interference in addition to those of the desired channel signals (or, if desired, only those of the adjacent channel interference). For example, the 3-path LCL-FRESH filtering structure can be generalized to include two additional paths, one for each of the upper and lower adjacent channels that can be present. The signals present in these two additional paths are highly correlated with the interference, from the corresponding adjacent channels, that contaminates the desired signals; thus, correctly linearly combining these additional paths with the other three paths can significantly reduce the adjacent channel interference. The resulting 5-path LCL-FRESH filtering structure 30 is depicted in FIG. 14, wherein $x_{13}(t)$ and $x_+(t)$ are the complex envelope signals from the lower and upper adjacent channels (i.e., downconverted to complex base-band from their respective RF carriers), respectively.

Figure 15:
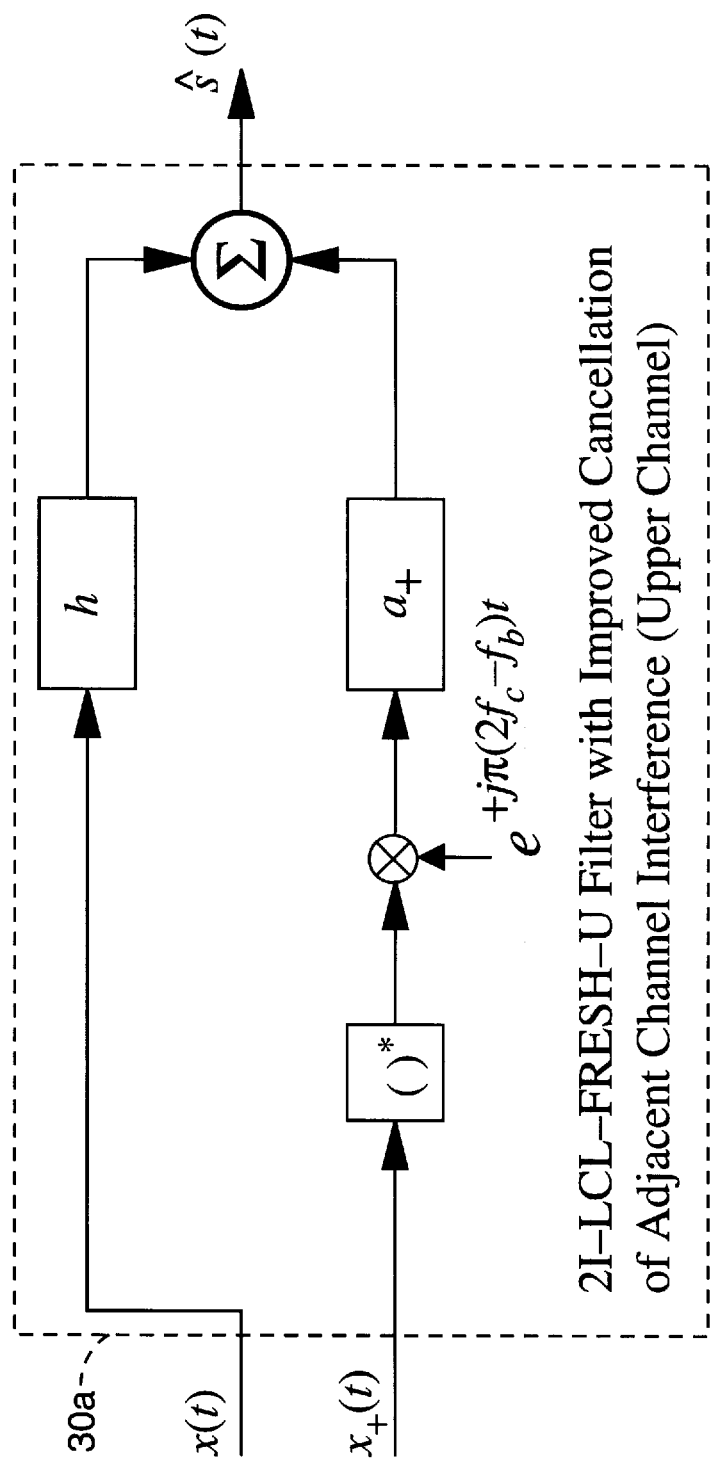
FIG. 15 is a functional block diagram of a 2-input, 2-path LCL-FRESH filter in accordance with the present invention for canceling adjacent upper channel interference.
Figure 16:
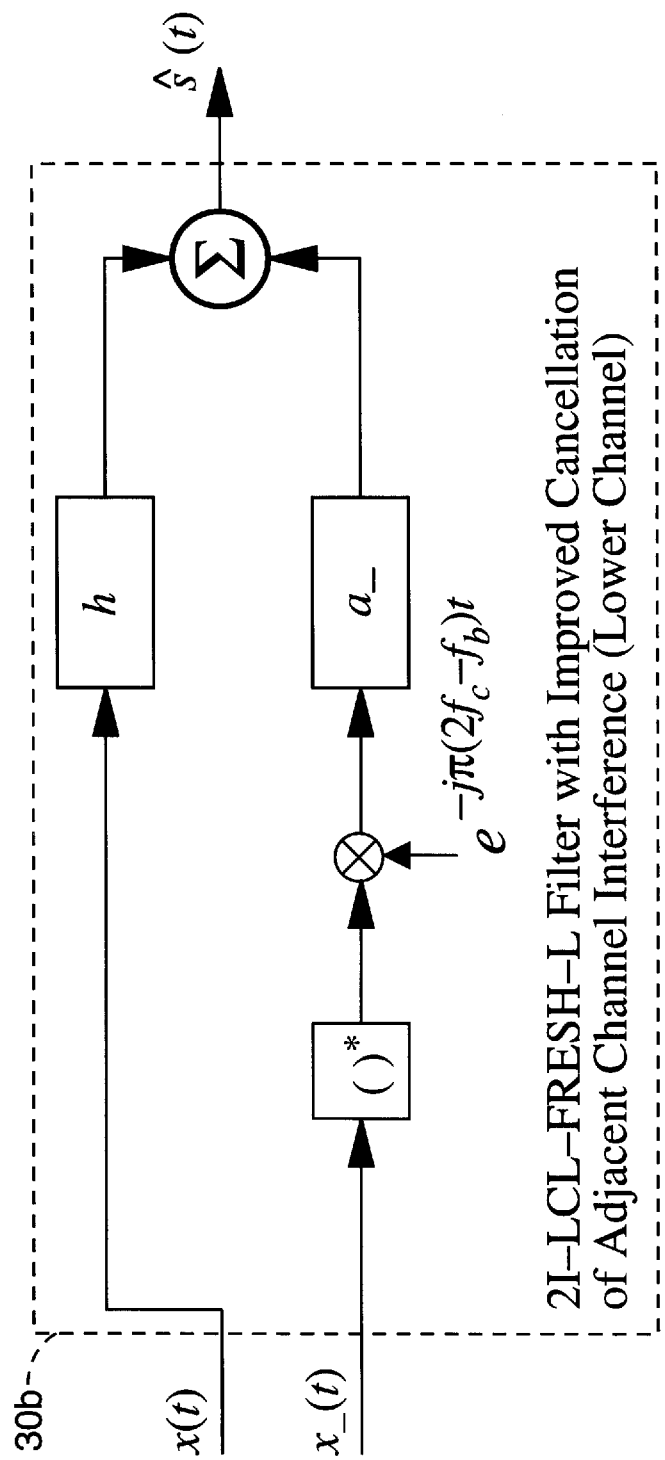
FIG. 16 is a functional block diagram of a 2-input, 2-path LCL-FRESH filter in accordance with the present invention for canceling adjacent lower channel interference.

Or, if only adjacent channel interference rejection is desired, such that functionality is limited to the cancellation of adjacent channel interference, instead of joint cancellation of adjacent- and co-channel interference, signal separation, and distortion correction, then the two-input two-path LCL-FRESH filtering structures 30a, 30b, which are shown in FIG. 15 (2 I-LCL-FRESH-U) and FIG. 16 (2 I-LCL,-FRESH-L), respectively, can be used to remove interference from either the upper adjacent channel by using input $x_+(t)$ and frequency shift $f_c-f_b/2$, or the lower adjacent channel by using input $x_-(t)$ and frequency shift $-f_c+f_b/2$, respectively, where $f_c$ is the separation between adjacent carriers. As an alternative, interference from both upper and lower adjacent channels can be simultaneously removed using the 3-input 3-path LCL-FRESH filter 30c shown in FIG. 17 (3 I-LCL-FRESH-UL).

Based on the aforementioned descriptions of the manner in which the LCL-PTV, LCL-FRESH-FSE, LCL-FSE, RI-FSE, LCL, and RI filtering structures can be obtained from the 3-path FRESH filter, those skilled in the art of signal processing will appreciate that these filtering structures can also be generalized to improve their ability to reject adjacent channel interference. Such generalization may be accomplished by altering these filtering structures to exploit the cyclostationarity properties of the adjacent channel interference.

Finally, it is noted that combinations of the outputs of various filtering structures may be used advantageously. For example, each of two copies of the 3-path LCL-FRESH filter can be applied to each of the lower and upper adjacent channels to provide improved estimates of the adjacent channel signals; these estimates can then be appropriately frequency-shifted, adaptively filtered, and then subtracted from the received data in the desired frequency channel, thus reducing the adjacent channel interference. The signal resulting thereby can then be processed by the 3-path LCL-FRESH filter to separate co-channel signals and correct for distortion. The adjacent channel interference canceling filters can either be adapted jointly with the co-channel separation and distortion correction filters or be adapted separately.

Filter Generalization

It will be appreciated that each of the foregoing filter structures include filters (comprising time-shifters and linear combiners), frequency shifters, polarized switchers (conjugators or real- or imaginary-part selectors), and summers (linear combiners). Thus, common core elements of all of these filtering structures are time-shifters, frequency shifters, polarized switchers, and linear combiners. Table 1 below maps conjugate cycle frequencies and input and output sampling rates into frequency-shift values and polarized switch functions (e.g., conjugation or real- or imaginary-part extraction) defining the specific filter structures described herein.

than the latter. Alternatively, the 3-path LCL-FRESH filter can be replaced by either the LCL-PTV filter or the 5-path LCL-FRESH filter in either FIG. 18 or FIG. 19, or by any of the LCL-FRESH-FSE, LCL-FSE, RI-FSE, LCL, and RI filters filter in either FIG. 18 or FIG. 19 to yield a bit-rate-sampled estimate $\hat{s}(k)$ of the desired signal waveform.

Variations: Single vs. Multiple Sensors, & Single vs. Multiple Desired Signals By using the spectral redundancy theory of cyclostationary signals, we have proven mathematically that the best performing method for combining FRESH-filtering capability and spatial-filtering (multi-sensor linear combining) capability is to replicate the best single-sensor FRESH filter by passing the data from each sensor through its own FRESH-filter prior to linearly combining the multiple data sets. This results in a special form of periodically time-variant linear-conjugate spatio-temporal filter. For example, using the single-sensor 3-path LCL-FRESH filter with M sensors yields the 3-path M-sensor LCL-FRESH (3-path MS-LCL-FRESH) spatio-temporal filter. Therefore, it follows that the LCL-FRESH, LCL-PTV, LCL-FRESH-FSE, LCL-FSE, RI-FSE, LCL, and RI filtering structures can apply not only to single-sensor receivers (in which case $x(t)$ is a scalar signal and the LTI or FSE filters in each signal path are single-input filters) but also to multiple-sensor receivers (in which case $x(t)$ is a vector signal and the LTI

TABLE 1

Figure 5:
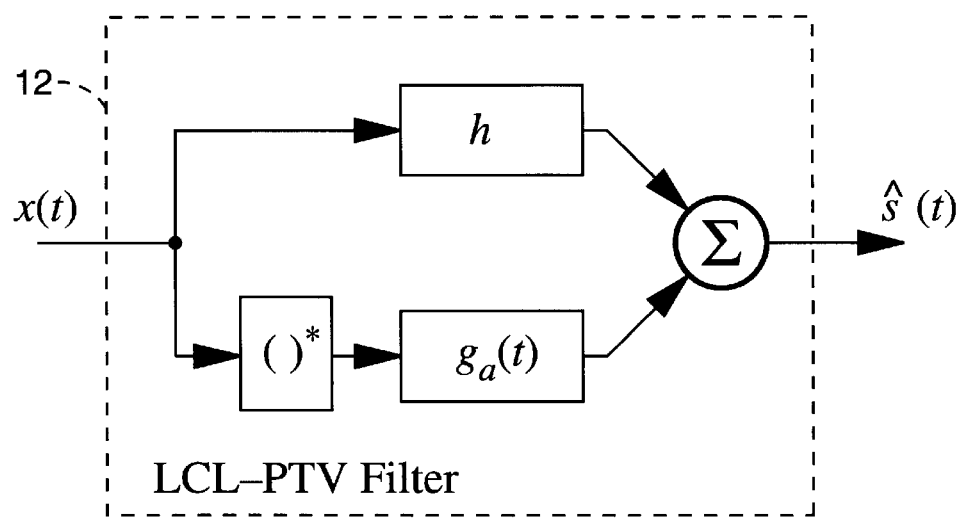
FIG. 5 is a functional block diagram of an LCL-PTV filter in accordance with the present invention for performing interference rejection and/or co-channel separation and/or distortion correction for GMSK or other MSK signals.
Figure 6:
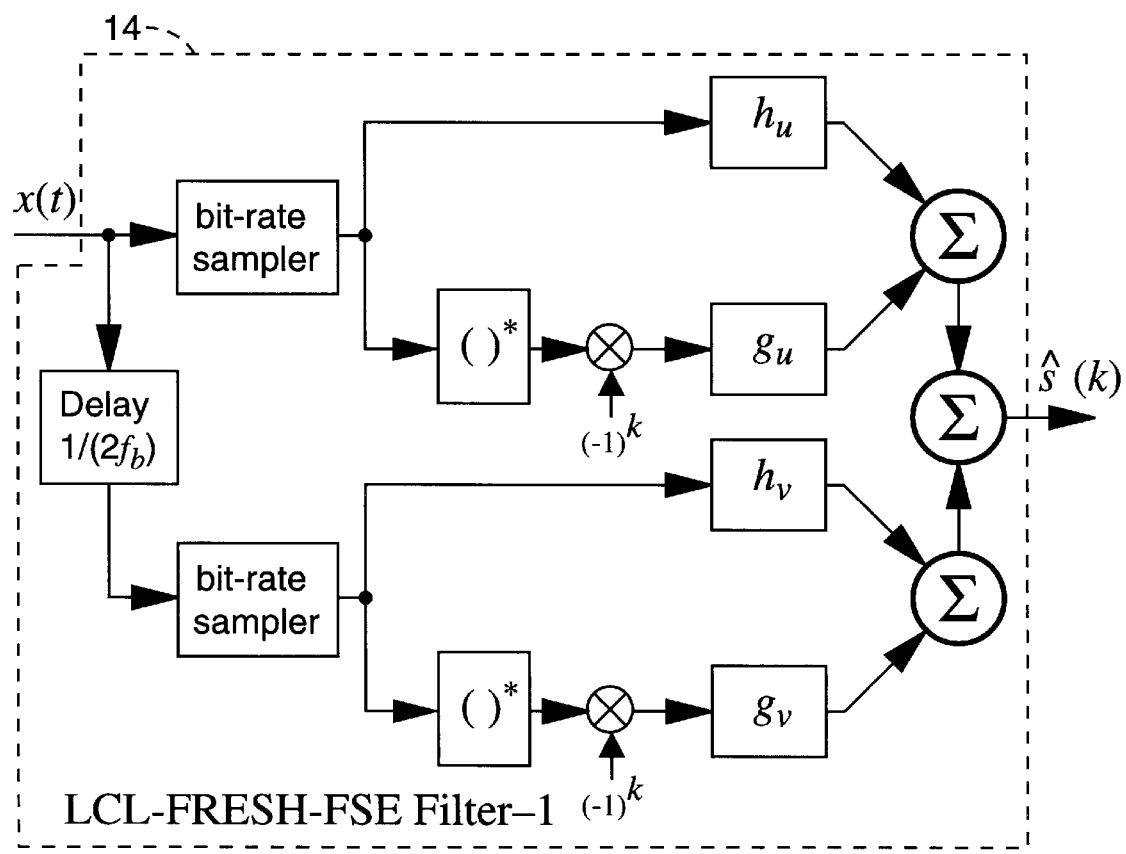
FIG. 6 is a functional block diagram of a "type-1" LCL-FRESH-FSE filter in accordance with the present invention for performing interference rejection and/or co-channel separation and/or distortion correction for GMSK or other MSK signals.
Figure 7:
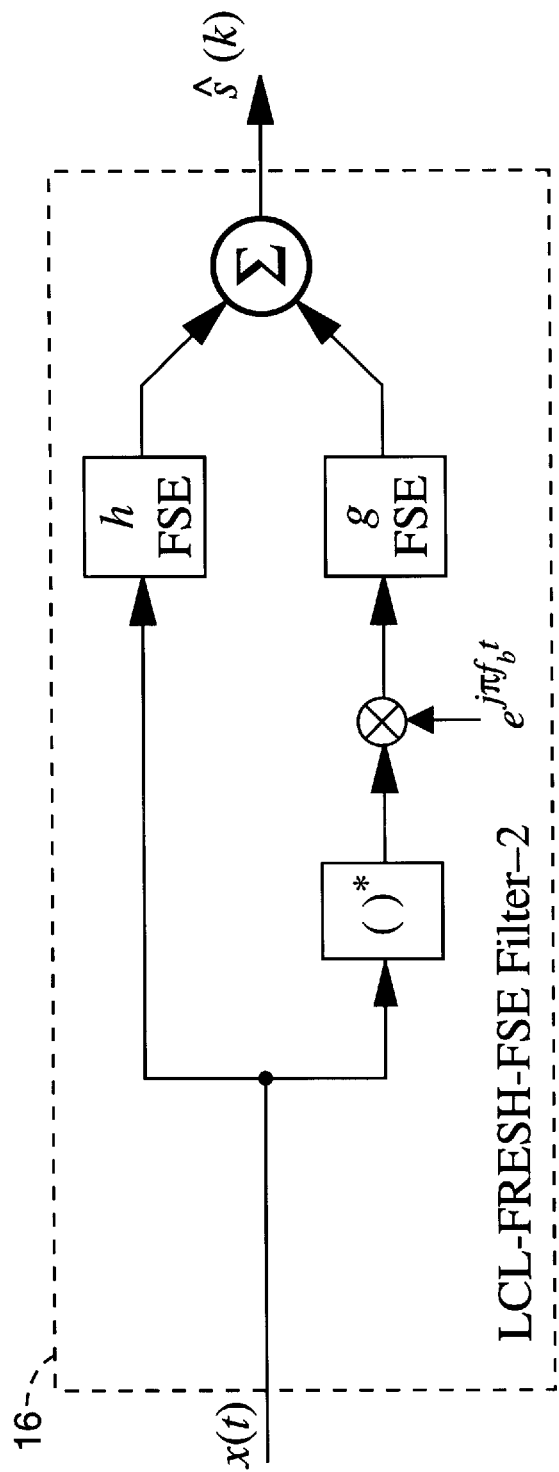
FIG. 7 is a functional block diagram of a "type-2" LCL-FRESH-FSE filter in accordance with the present invention for performing interference rejection and/or co-channel separation and/or distortion correction for GMSK or other MSK signals.

| Conjugate Cycle Frequencies, Input/Output Sampling Rates† | Filtering Structures* |
|---|---|
| $\pm f_b/2$, O/O | FIG. 4, LCL-FRESH (FIG. 5, LCL-PTV) |
| $\pm f_b/2$, O/B | FIG. 7, LCL-FRESH-FSE-2 (FIG. 6, 8, 9, 10, 11) |
| $\pm f_b/2$, B/B | FIG. 12, LCL (FIG. 13) |
| $2f_c - f_b/2$, O/O | FIG. 15, 2I-LCL-FRESH-U |
| $-2f_c + f_b/2$, O/O | FIG. 16, 2I-LCL-FRESH-L |
| $2f_c - f_b/2, -2f_c + f_b/2$, O/O | FIG. 17, 3I-LCL-FRESH-UL |
| $\pm f_b/2, -2f_c + f_b/2, 2f_c - f_b/2$, O/O | FIG. 14, 5-path LCL-FRESH |

†$f_c$ = separation between adjacent carriers, O = oversampled, and B = bit rate sampled.
*The filter structures listed in parenthesis are mathematically equivalent to the basic structure not in parenthesis, and the former can be derived from the latter by standard block diagram manipulations.

It will further be appreciated that each of the foregoing filtering structures are baseband structures designed for complex baseband signals corresponding to a desired down-converted channel centered at zero frequency, and if the desired channel is centered at a non-zero frequency, then standard baseband-to-passband transformations can be applied to these baseband filtering structures to obtain their passband counterparts for processing passband signals.

Joint Space-Time Filtering and Factorized Filtering

Figure 19:
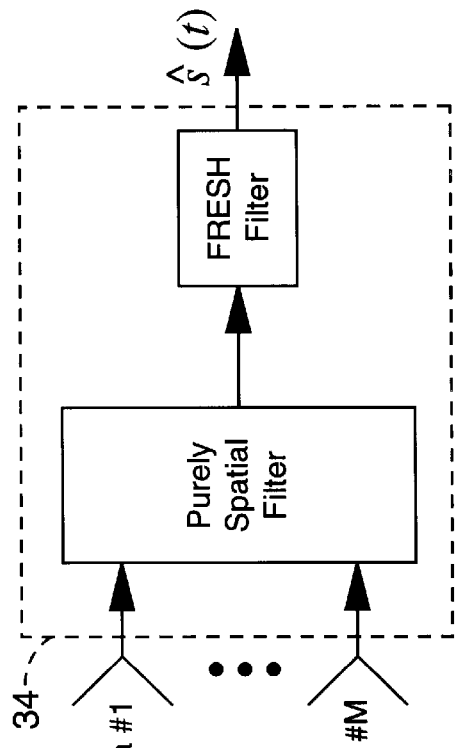
FIG. 19 is a functional block diagram of space-time factorized processor in accordance with the present invention.
Figure 18:
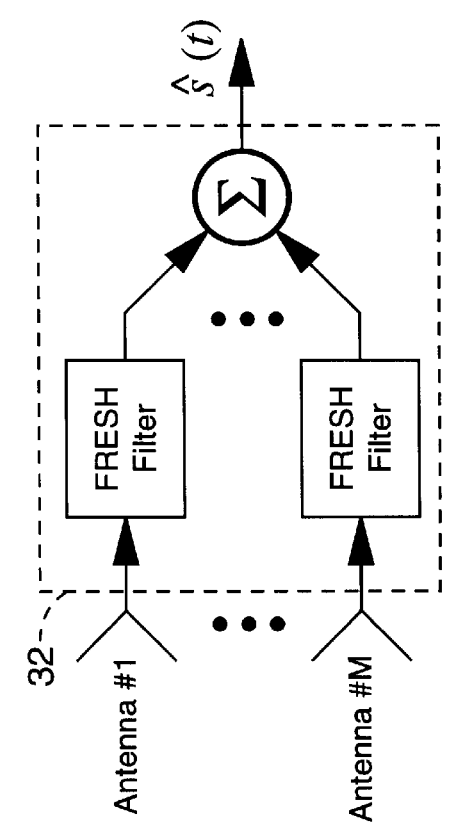
FIG. 18 is a functional block diagram of a joint space-time multi-sensor FRESH filter in accordance with the present invention.

As depicted in FIG. 18 and FIG. 19, any of the aforementioned filtering structures can be used in either of two ways: (1) in a joint space-time filtering structure 32, in which each antenna output is processed by one of these filters, and then the filtered outputs are summed, or (2) in a space-time factorized filtering structure 34, in which a purely spatial filter is applied to the received array data, and then the spatially filtered data is processed by one of these filters. The former structure has the capability to attain higher performance at the expense of greater complexity or FSE filters in each signal path are multiple-input filters). Similarly, the LCL-FRESH, LCL-PTV, LCL-FRESH-FSE, LCL-FSE, RI-FSE, LCL, and RI LCL filtering structures can be applied to estimate a single desired signal (in which case the LTI or FSE filters in each signal path are single-output filters; in this case, if multiple signals are desired to be estimated, then multiple copies of the filtering structure can be implemented in parallel) as well as to estimate multiple desired signals (in which case the LTI or FSE filters in each signal path are multiple-output filters). It will also be appreciated that the frequency-shifters and conjugators employed in the filters, as well as the real and imaginary part extractors, become multiple-input devices. These observations emphasize the fact that the novelty and utility of the filtering structures reside largely not in the dimensions of the signals in any particular signal path within the structure but rather within the patterns of conjugations, real-part and imaginary-part selections, frequency shifts, and sampling operations and the ways in which linear combinations of signals subjected to these transformations are formed.

Implementation of LTI and FSE Filters

It will be appreciated by those skilled in the art of signal processing that the linear-time-invariant (LTI) filters and FSE filters describing the various filtering structures of the present invention can be implemented in numerous ways. In one such implementation, an LTI filter is implemented as an FIR filter and is applied to its input by using the well-known overlap-and-add or overlap-and-save algorithms that utilize the fast Fourier transform (FFT). In another such implementation, an LTI filter is implemented using a tapped delay line, multipliers attached to each tap, and a summer. In yet other implementations, the LTI filter might be implemented using an infinite-impulse response (IIR) filter instead of an FIR filter; however, it is noted that adapting such filters can be computationally expensive and/or unreliable.

Demodulation of Recovered Signals

Finally, the interaction between the filtering structures (used for interference rejection and/or co-channel signal separation) and the demodulator (used for recovering the bit stream from the estimate of the desired signal) must be considered. Several demodulators are currently in use for GMSK signals: the maximum likelihood sequence estimator (MLSE) based on the Viterbi algorithm, the multiple-symbol differential detector, and the decision feedback equalizer (DFE). Any one of these demodulators can be used following the filtering structures to demodulate the estimated signal of interest. Alternatively, since the DFE is itself a filtering structure, it is reasonable to merge the demodulation function implemented by the conventional DFE and the interference-rejection and/or signal-separation functions implemented by the space-time filtering structure; the resulting filtering structure would have the desirable property of very low complexity relative to the receivers based on MLSE or multiple-symbol differential detection, and may be capable of attaining a higher-quality recovered bit stream due to its smaller number of adjustable coefficients for the same memory length.

Because all of the alternative filtering apparatus described herein include the capability of the feedforward part of the DFE, the result of merging the filtering apparatus with the DFE is that the filtering apparatus, be it single- or multiple-sensor, is simply followed by the feedback part of the DFE. Thus, the feedback part alone functions as the demodulator. Algorithms for adaptively adjusting this demodulator are not within the scope of this invention.

Similarly, the complexity of the MLSE demodulator can be reduced and its performance can possibly be increased by the effects of the distortion-removal capability of the FRESH filtering structures. For example, the requirements of the channel estimator that is an integral part of the MLSE demodulator can be eased by virtue of the distortion removal or even just distortion reduction.

D. Adaptation Methods

The following discussion of adaptation methods is made in the context of the GSM system, which is one type of wireless communication system to which the present invention applies. Those skilled in the art of communication systems and signal processing will appreciate that these adaptation methods can apply also to any other communication system that uses signals with embedded training sequences and constant modulus.

Figure 20:
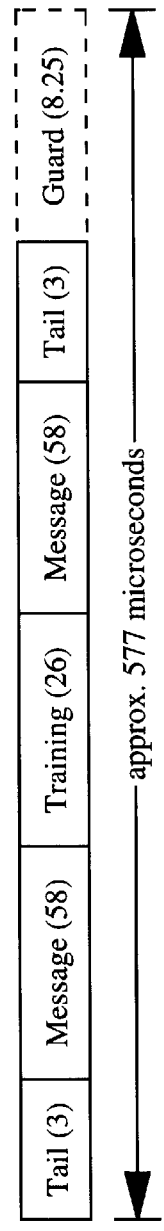
FIG. 20 is a data structure timing diagram for a time slot in a GSM system, showing the number and location of each type of bit.
Figure 21:
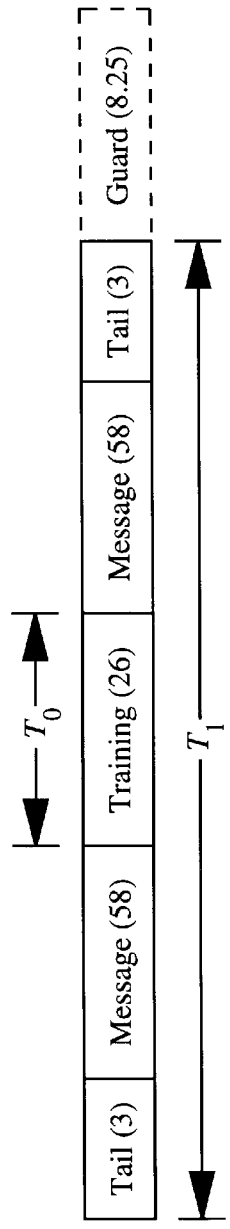
FIG. 21 is a data structure timing diagram showing the time periods $T_0$ and $T_1$ for the time slot shown in FIG. 20.

In GSM, each time slot lasts 577 μs (156.25 bit periods at 270.833 kbits/sec) and the bits therein are structured as shown in FIG. 20. The three tail bits on either side of the main burst are all zeros, and the guard time lasting 8.25 bit periods prevents consecutive time slots from colliding due to different bulk propagation delays. The 116-bit message in each slot can be either digitized speech (after vocoding, convolutional coding, and interleaving) or control information. The 26-bit training sequence embedded in the middle of the slot is used in existing conventional GSM receivers, for example, to perform channel estimation prior to MLSE demodulation.

In the present invention, not only is this convenient training sequence exploited but also the very useful constant-envelope (or constant-modulus) property of GMSK and other MSK signals is exploited to adapt the filter coefficients. Four adaptation algorithms are explained, the first two of which are conventional and the second two of which are novel and unique to the present invention:

1. conventionally trained adaptive equalization;
2. constant-modulus (CM) blind adaptive equalization;
3. training-augmented constant-modulus (TACM) partially blind adaptive equalization; and
4. training-constrained constant-modulus (TCCM) partially blind adaptive equalization.

The first two adaptation algorithms provide the building blocks for the second two. All four of these algorithms are directed to finding the values of the filter coefficients in a matrix W that controls a linear combiner (the number of columns in this matrix is set to be equal to the number of desired signals to be estimated and the number of rows is set to be equal to the number of weights in the linear combiner to be adaptively adjusted). The linear combiner applies these complex weights to the elements of a vector y(t) containing various differently delayed, frequency-shifted, and possibly conjugated versions of the received data from the M-sensors (denoted by the vector x(t)) to produce a vector of signal estimates $\hat{s}(t)=W^H y(t)$, where superscript H denotes conjugate transposition. For example, in the 3-path LCL-FRESH filter, let each of the three filters be implemented by a tapped delay line (TDL) containing L taps, followed by a linear combiner. Then the signal estimate $\hat{s}(t)$ can be expressed as $$\hat{s}(t) = W^H \begin{bmatrix} x(t) \\ x(t-1) \\ \vdots \\ x(t-L+1) \\ x^*(t)e^{j\pi f_b t} \\ x^*(t-1)e^{j\pi f_b t} \\ \vdots \\ x^*(t-L+1)e^{j\pi f_b t} \\ x^*(t)e^{-j\pi f_b t} \\ x^*(t-1)e^{-j\pi f_b t} \\ \vdots \\ x^*(t-L+1)e^{-j\pi f_b t} \end{bmatrix} = W^H y(t), \tag{4}$$

where y(t) is defined in the obvious way. Similar definitions of y(t) can be constructed for the LCL-FRESH-FSE, LCL-FSE, RI-FSE, LCL, and RI filtering structures, as well as for the 5-path LCL-FRESH filter and any extensions of these in which the number of paths, patterns of conjugations or real-part and imaginary-part selectors, choices of frequency shifts, and origins of input signals for the various paths are altered. Thus, in the following descriptions, no further reference to the specific dependencies of y(t) on x(t) is made, since all of the filtering structures of the present invention can be represented using this common framework. Furthermore, to simplify the descriptions only the case of W having a single column is considered; to emphasize that the matrix degenerates to a vector in this case, the set of filter coefficients is denoted by w.

Conventionally Trained Adaptive Equalization

In conventionally trained adaptive equalization, the receiver knows that a training signal $s_0(t)$ is transmitted by the desired user starting at time $t_{01}$ and ending at time $t_{02}$. This knowledge and the received data are used to find w. Specifically, w is chosen so as to minimize the time-averaged squared error between the training signal $s_0(t)$ and the estimate $\hat{s}(t)$ over the training interval (i.e., for all $t \in T_0$, where $T_0 = [t_{01}, t_{02}]$):

$$\min_w \langle |\hat{s}(t) - s_0(t)|^2 \rangle_{t \in T_0} \leftrightarrow w = (R_{yy}^{(T_0)})^{-1} R_{ys_0}^{(T_0)}, \quad (5)$$

where $\langle \cdot \rangle_{t \in T_0}$ denotes time-averaging over the period $t_{01} \leq t \leq t_{02}$, and the correlation matrix between any two vectors (or scalars) a(t) and b(t) is defined by $R_{ab}^{(T_0)} = \langle a(t) b^H(t) \rangle_{t \in T_0}$. With reference to GSM systems and FIG. 21, $T_0$ is the time interval containing the embedded training signal. This method is simple to implement, with low computational complexity when implemented using the recursive least squares (RLS) algorithm or any of the various fast algorithms (e.g., the modular multichannel method or the fast affine projection algorithm), and it converges reliably and quickly when the length of the training sequence exceeds the number of filter coefficients (i.e., the length of w). However, in the presence of strong co-channel interference and/or when the length of w is comparable to or greater than the length of the training signal, this conventionally trained adaptive equalization algorithm may not provide sufficiently reliable or high quality signal estimates.

Constant Modulus (CM) Blind Adaptive Equalization

In total contrast to the conventionally trained adaptive equalizer, the constant-modulus (CM) blind adaptive equalizer ignores completely any training signal information. Instead, in this application it exploits the fact that GMSK and other MSK signals have constant modulus (constant envelope), a property which is degraded or destroyed by the presence of co-channel interference and channel distortion. The CM algorithm attempts to solve the following minimization problem:

$$\min_w \left\langle \left| \hat{s}(t) - \frac{\hat{s}(t)}{|\hat{s}(t)|} \right|^2 \right\rangle_{t \in T_1}, \quad (6)$$

where $T_1$ our case is the set of all time instants within a particular time slot. Since this is a nonlinear minimization problem with no closed-form solution, and a least-mean-squares (LMS) stochastic gradient descent algorithm would converge much too slowly, an iterative block approach (the so-called least-squares CM algorithm) is used. At the $k^{th}$ iteration, the weight vector $W_k$ is found by solving $$\min_{w_k} \langle |w_k^H y(t) - z_{k-1}(t)|^2 \rangle_{t \in T_1} \quad (7)$$

where $$z_{k-1}(t) = \frac{w_{k-1}^H y(t)}{|w_{k-1}^H y(t)|}.$$

That is, the modulus normalized term in the squared error is obtained from the filter output during the previous iteration. This allows a simple linear solution to be found:

$$W_k = (R_{yy}^{(T_1)})^{-1} R_{yz_{k-1}}^{(T_1)}. \quad (8)$$

These two steps, finding the modulus-normalized filter output and solving this linear equation, are iterated until convergence. The CM algorithm allows the equalizer to be adapted successfully in the absence of a training signal, although it is known to exhibit unreliable convergence in some situations and its reliability may be lower than desired when the observation interval is short (as it is for GSM time slots). Another complication with the CM algorithm arises when it is applied to environments containing multiple co-channel signals. Multi-target CM algorithms have been developed to allow multiple sets of filter weights to be adapted, each to extract a different signal. A subsequent signal sorting operation must then be performed to identify the correspondence between extracted signals and users; this correspondence can be achieved easily if the users are assigned different training sequences. Notice though that this training signal information might be more profitably used for adaptation of the filter weights themselves rather than simply to sort the output of the blindly adapted filters. This observation is pursued through two other adaptive algorithms, discussed below.

Training-Augmented CM (TACM) Partially Blind Adaptive Equalization

Unlike the conventionally trained adaptive equalizer and the CM blind adaptive equalizer, each of which ignores significantly useful information that is exploited by the other, the TACM partially blind adaptive equalizer exploits both is the training signal available in GSM and the constant modulus property. The motivation for these approaches is the belief that minimization of a convex linear combination of the two cost functions in Equation (5) and Equation (7) will yield better performance than minimization of either cost function alone, since the two cost functions cannot be simultaneously minimized in general. The resulting cost function is given by $$\gamma \langle |w_k^H y(t) - z_{k-1}(t)|^2 \rangle_{t \in T_1} + (1-\gamma) \langle |w_k^H y(t) - s_0(t)|^2 \rangle_{t \in T_0}. \quad (9)$$

As in the conventionally training adaptive equalizer for use in GSM systems, $T_0$ is the time interval occupied by the embedded training signal (FIG. 20). The time period $T_1$ over which the CM algorithm is applied can be either the entire time slot, or the time slot excluding the training signal. Either way, the closed-form solution is given by $$w_k = [\gamma R_{yy}^{(T_1)} + (1-\gamma) R_{yy}^{(T_0)}]^{-1} [\gamma R_{yz_{k-1}}^{(T_1)} + (1-\gamma) R_{ys_0}^{(T_0)}]. \quad (10)$$

The convex linear combiner weight $\gamma$ controls the influence of the two cost functions and thus also controls the emphasis given to the two distinct types of knowledge used in them.

Values of γ closer to unity give more influence to the exploitation of the CM property, whereas values closer to zero give more influence to the exploitation of the known training signal.

It is noted that a special case of the TACM arises when the initial condition is zero (i.e., w=0) and γ=1. In this case, the TACM yields an algorithm in which the known training signal is used to initialize the conventional CM algorithm at iteration k=1 with $w_1 = [R_{yy}^{(T_0)}]^{-1} R_{ys_0}^{(T_0)}$.

In the event that $s_0(t)$ is a constant-modulus signal (e.g., as it is for GMSK, CPFSK, and other MSK signals), then $s_0(t)$ should be pre-normalized to have unity modulus prior to its use in the TACM algorithm. In the event that $s_0(t)$ is not a constant-modulus signal, then an adaptive normalization constant must be inserted into the TACM cost function above to yield the adaptively normalized TACM (AN-TACM) algorithm:

$$\gamma < |w_k^H y(t) - z_{k-1}(t)|^2 >_{t \in T_1} + (1-\gamma) < |w_k^H y(t) - c^* s_0(t)|^2 <_{t \in T_0}. \quad (11)$$

where c is a complex scalar. The solution to this problem is obtained by equating to zero the complex gradients with respect to $w^*_k$ and $c^*$ to obtain $$[\gamma R_{yy}^{(T_1)} + (1-\gamma) R_{yy}^{(T_0)}] w_k - (1-\gamma) R_{ys_0}^{(T_0)} c = \gamma R_{yz_{k-1}}^{(T_1)} \quad (12)$$

$$R_{s_0 y}^{(T_0)} w_k - R_{s_0 s_0}^{(T_0)} c = 0. \quad (13)$$

This system of equations is solved by $$\begin{bmatrix} w_k \\ c \end{bmatrix} = \begin{bmatrix} R_{11} & R_{12} \\ R_{21} & R_{22} \end{bmatrix}^{-1} \begin{bmatrix} \gamma R_{yz_{k-1}}^{(T_1)} \\ 0 \end{bmatrix} \quad (14)$$

where $R_{11} = \gamma R_{yy}^{(T_1)} + (1-\gamma) R_{yy}^{(T_0)}$, $R_{12} = -(1-\gamma) R_{ys_0}^{(T_0)}$, $R_{21} = R_{s_0 y}^{(T_0)}$, and $R_{22} = -R_{s_0 s_0}^{(T_0)}$.

Training-Constrained CM (TCCM) Partially Blind Adaptive Equalization

The TCCM differs from the TACM in the way that it attempts to exploit both types of knowledge. In particular, when the number of filter coefficients is greater than or equal to the number of samples of the training signal, the linear system used by the conventionally trained adaptive equalizer (implied in Equation (5)) is under-determined. That is, the training signal is sufficient only to restrict $W_k$ to lie in some subspace but not to define it completely. Specifically, in this case all that can be said so far is that $w_k$ is given by $$w_k = (R_{yy}^{(T_0)})^+ R_{ys_0}^{(T_0)} + v_k = w^{(T_0)} + v_k, \quad (15)$$

where superscript ( )⁺ denotes the Moore-Penrose pseudoinverse, $v_k$ is any vector in the null space of $R_{yy}^{(T_0)}$, and $w^{(T_0)}$ is defined in the obvious way. The constraint on $v_k$ ensures that $W_k^H y(t)$ exactly reproduces the training interval signal over time interval $T_0$. The CM property is then used to select $v_k$, where k denotes as before the iteration in the block least-squares implementation of the CM algorithm. The resulting cost function is obtained simply by substituting Equation (15) into Equation (7) and minimizing with respect to $v_k$ to obtain the solution $$v_k = V_n (V_n^H R_{yy}^{(T_1)} V_n)^{-1} V_n^H R_{y \mu_{k-1}}^{(T_1)}, \quad (16)$$

where $$\mu_{k-1}(t) = z_{k-1}(t) - (w^{(T_0)})^H y(t) \quad (17)$$

and the columns of $V_n$ are the eigenvectors associated with the negligible eigenvalues of $R_{yy}^{(T_0)}$.

An alternative algorithm can be obtained by first solving for the CM weight vector according to Equation (8) and then projecting this vector onto the affine space $\{w_k = w^{(T_0)} + V_n c_k:$ for all $c_k\}$. The resulting solution is $$w_k = w^{(T_0)} + V_n V_n^H (R_{yy}^{(T_1)})^{-1} R_{yz_{k-1}}^{(T_1)} \quad (18)$$

and thus $w_k^H y(t)$ exactly reproduces the training signal over the time interval $T_0$. As with the TACM, if the desired signal $s_0(t)$ has constant modulus, as is the case with GMSK, CPFSK, and other MSK signals, then $s_0(t)$ should be normalized to have unity modulus. Finally, each of the two versions of the TCCM algorithm may be extended, through the adaptive normalization technique used in deriving the AN-TACM algorithm, to accommodate desired signals having non-constant modulus. These extensions are straightforward to obtain and so are not elaborated upon here.

Additional Adaptation Methods

In addition to the aforementioned TACM and TCCM methods and their various extensions and special cases, other adaptation methods can also be used to select the values of the coefficients in the filter. For example, the so-called decision-direction method of adaptation, in which a first phase of adaptation proceeds under control of some method (e.g., any of the aforementioned methods) to produce a medium-to-high quality signal estimate which can then be demodulated, and the resulting detected bits are used to form a known training signal which can be used together with the original perfect training data in a second phase of adaptation (e.g., through the conventional least-squares method).

E. Preferred Embodiment of an Overall Receiver

Figure 22:
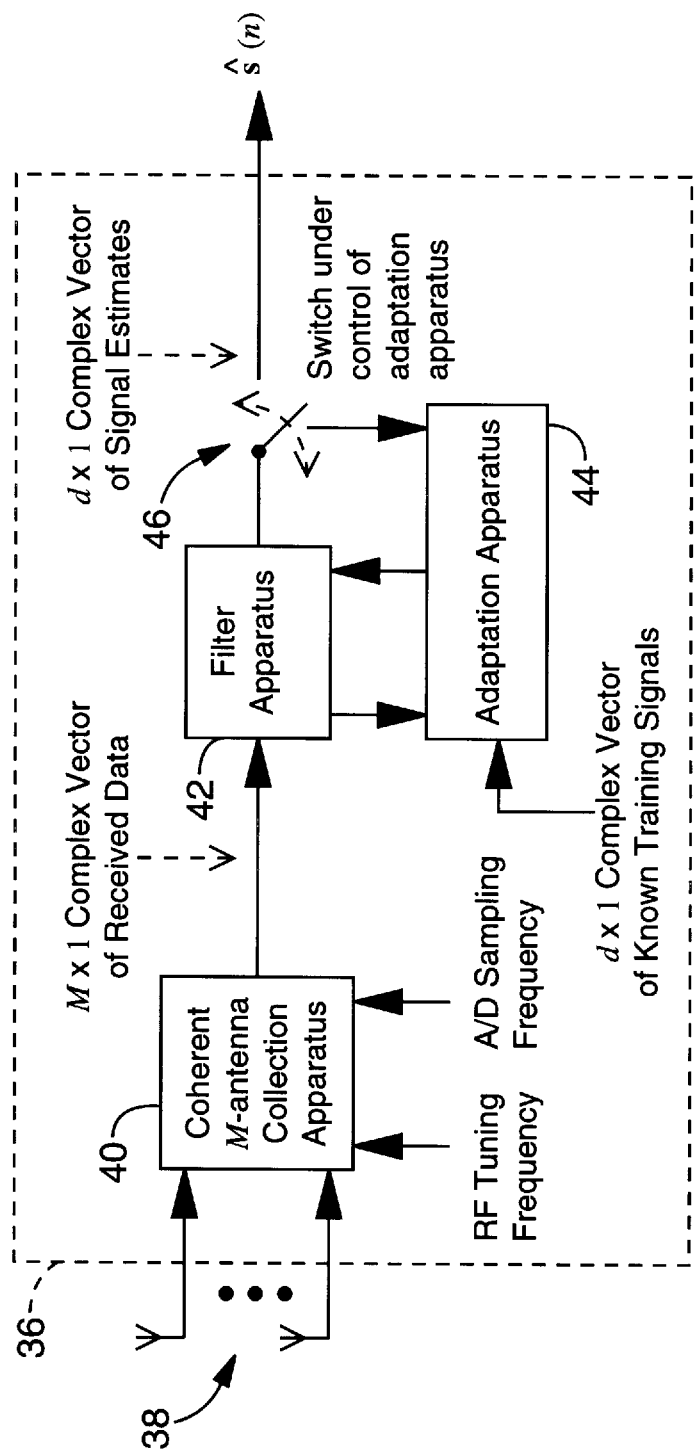
FIG. 22 is a functional block diagram of a receiver apparatus in accordance with the present invention.

FIG. 22 depicts a preferred embodiment of an overall receiver apparatus 36 in accordance with the present invention. RF signals at the outputs of the M antennas 38 are coherently downconverted to complex baseband and digitized by a Coherent M-Antenna Collection Apparatus 40, the output of which is a digitized discrete-time sequence of M×1 complex vectors, denoted elsewhere herein as x(t). This vector of received data is then provided as input to a Filter Apparatus 42, which takes as its other input the filter coefficients (W) provided by an Adaptation Apparatus 44, to produce a digitized discrete-time sequence of d×1 complex vector signal estimates $\hat{s}_k(n)$. During the adaptation process, a switch 46 at the output of the Filter Apparatus 42 directs the output of the Filter Apparatus 42 into the Adaptation Apparatus 44; upon the detection of convergence by the Adaptation Apparatus 44, such as when a prescribed number of iterations are completed, the switch 46 is moved to direct the output of the Filter Apparatus 42, the final signal estimate $\hat{s}(n)$, to subsequent processors such as demodulators that will render bit decisions to recover the binary data streams conveyed by the desired signals. An intermediate output of the Filter Apparatus 42 (denoted by y(t) herein) is also provided as input to the Adaptation Apparatus 44.

Figure 23:
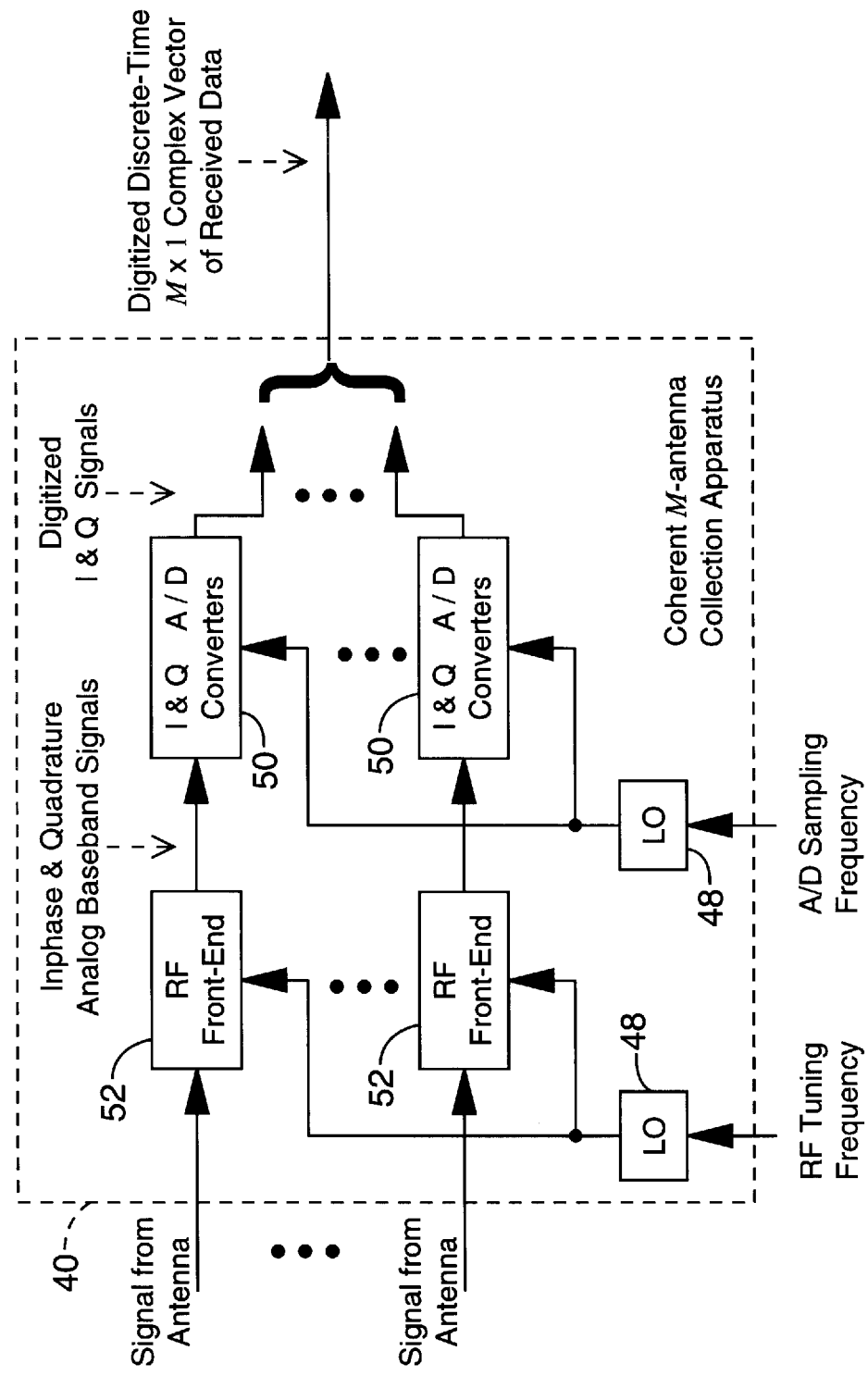
FIG. 23 is a functional block diagram of an embodiment of the coherent M-antenna collection apparatus block shown in FIG. 22.

A preferred embodiment of the Coherent M-Antenna Collection Apparatus 40 is shown in FIG. 23. This apparatus is controlled by user-supplied values for the RF tuning frequency and the A/D sampling clock frequency to control the local oscillators 48 used for the downconversion from real RF to complex baseband (also known as in-phase and quadrature-phase signals) and for the A/D converters 50, respectively. The RF front-ends 52 that perform this downconversion can be implemented in a variety of ways known well to those skilled in the art of RF design. Preferably the sampling clock frequency of the A/D converters is equal to an integer multiple of the bit rate $f_b$. With the exception of the LCL and RI filters for which a sampling rate off $f_b$ is needed, $2f_b$ represents a good compromise between the temporal resolution provided by oversampling and the excess of data and associated computational load induced by oversampling. The digitized discrete-time inphase and quadrature signals at the output of each pair of A/D converters are combined to form a representation of a single complex-valued digitized discrete-time signal. The M signals so formed, one per chain of hardware associated with a single antenna, are grouped into a digitized discrete-time M×1 complex vector of received data.

Figure 24:
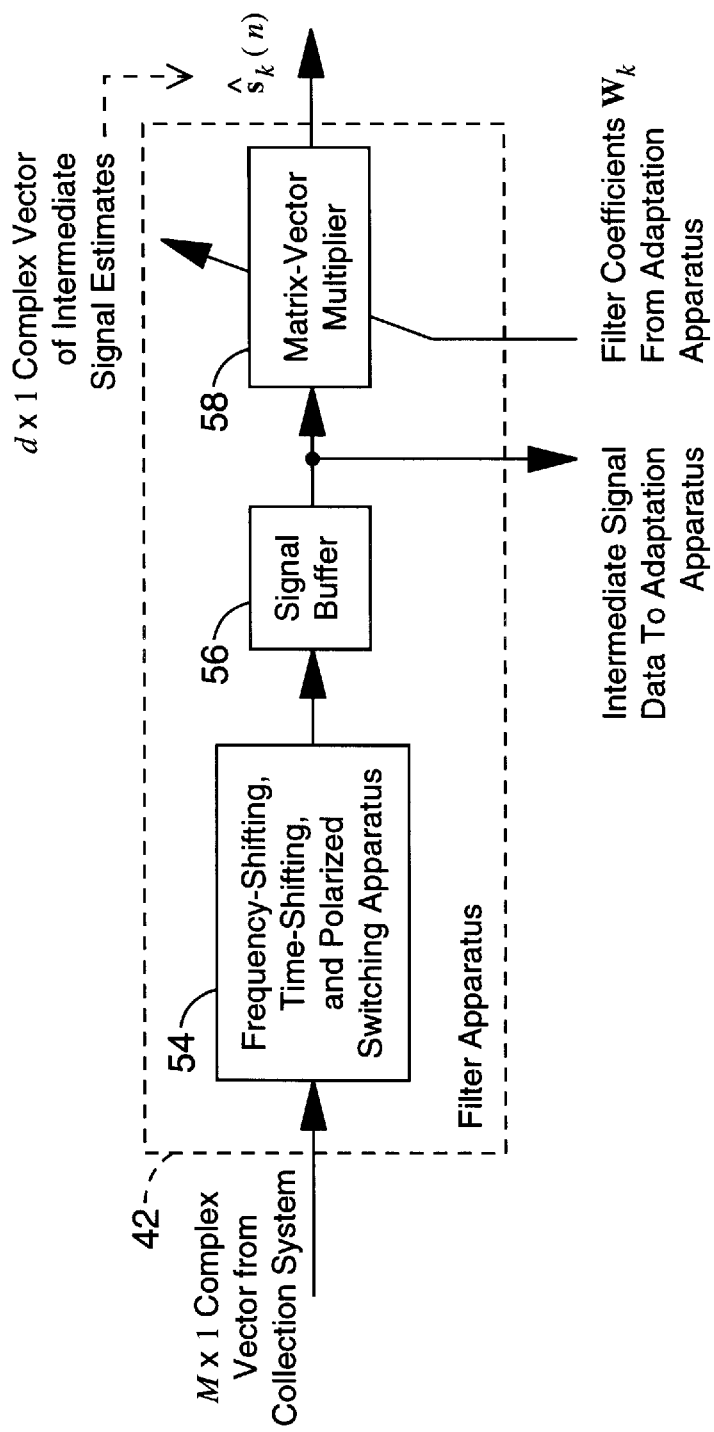
FIG. 24 is a functional block diagram of an embodiment of the filter apparatus block shown in FIG. 22.

A preferred embodiment of the Filtering Apparatus 42 is shown in FIG. 24. The Filtering Apparatus 42 accepts as input the M×1 complex vector of received data and the filter coefficients output from the Adaptation Apparatus 44. The received data is first processed by a Frequency-Shifting, Time-Shifting, and Polarized Switching (i.e., conjugation, real-part selection or imaginary-part selection) Apparatus 54 whose purpose is to form the vector y(t). The record of such transformed data y(t) is stored in a Signal Buffer 56, which can be implemented using dynamic RAM chips or other high-speed storage media, to allow y(t) to be made available to the Adaptation Apparatus 44 over multiple iterations of the adaptation algorithm implemented therein. A Matrix-Vector Multiplier 58 applies the filter coefficients to the received data, producing output $\hat{s}_k(n)$ for use in the subsequent iteration (number k+1) performed by the Adaptation Apparatus 44.

Figure 25:
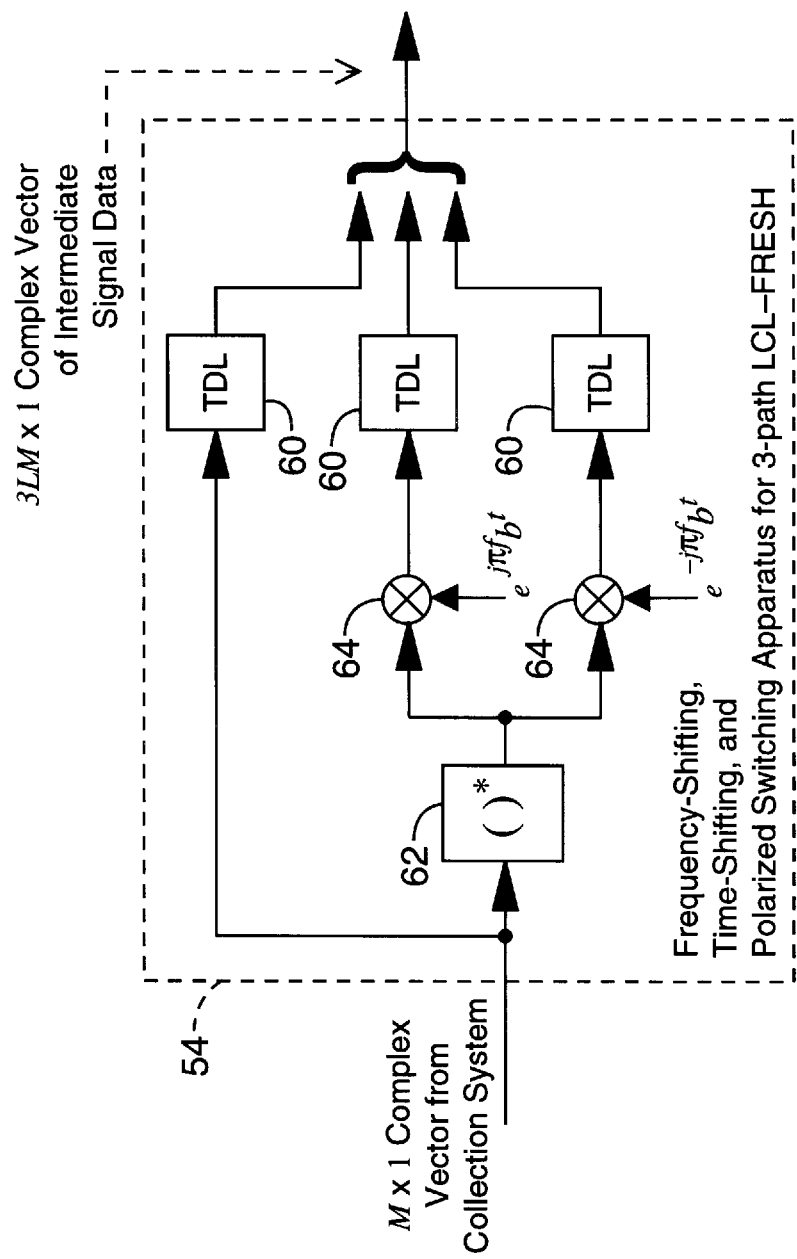
FIG. 25 is a functional block diagram of an embodiment of the frequency-shifting, time-shifting, and polarized switching apparatus block of the filter shown in FIG. 24 where the filter is configured as a 3-path LCL-FRESH filter.
Figure 26:
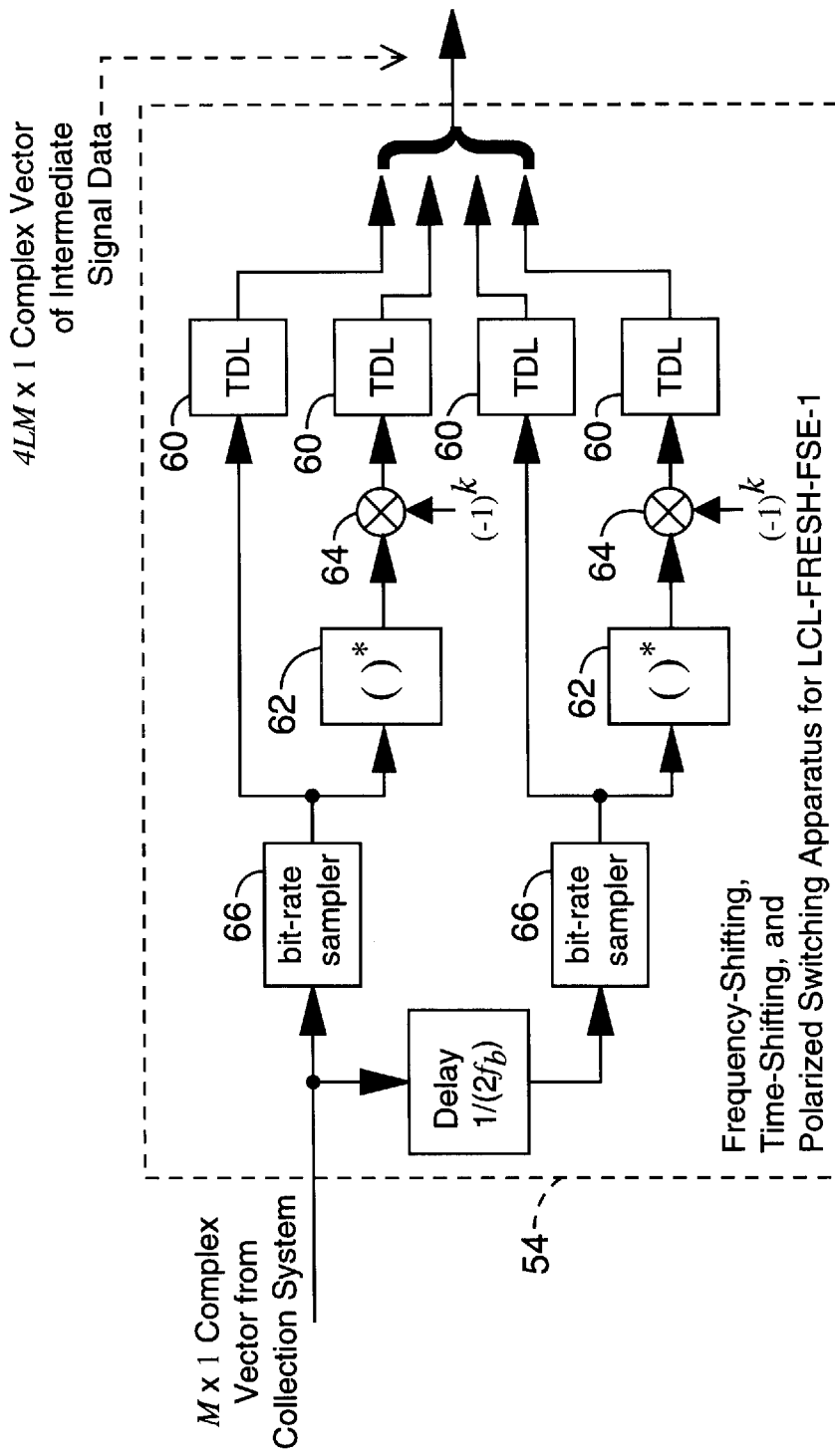
FIG. 26 is a functional block diagram of an embodiment of the frequency-shifting, time-shifting, and polarized switching apparatus block of the filter shown in FIG. 24 where the filter is configured as a type-1 LCL-FRESH-FSE filter.
Figure 27:
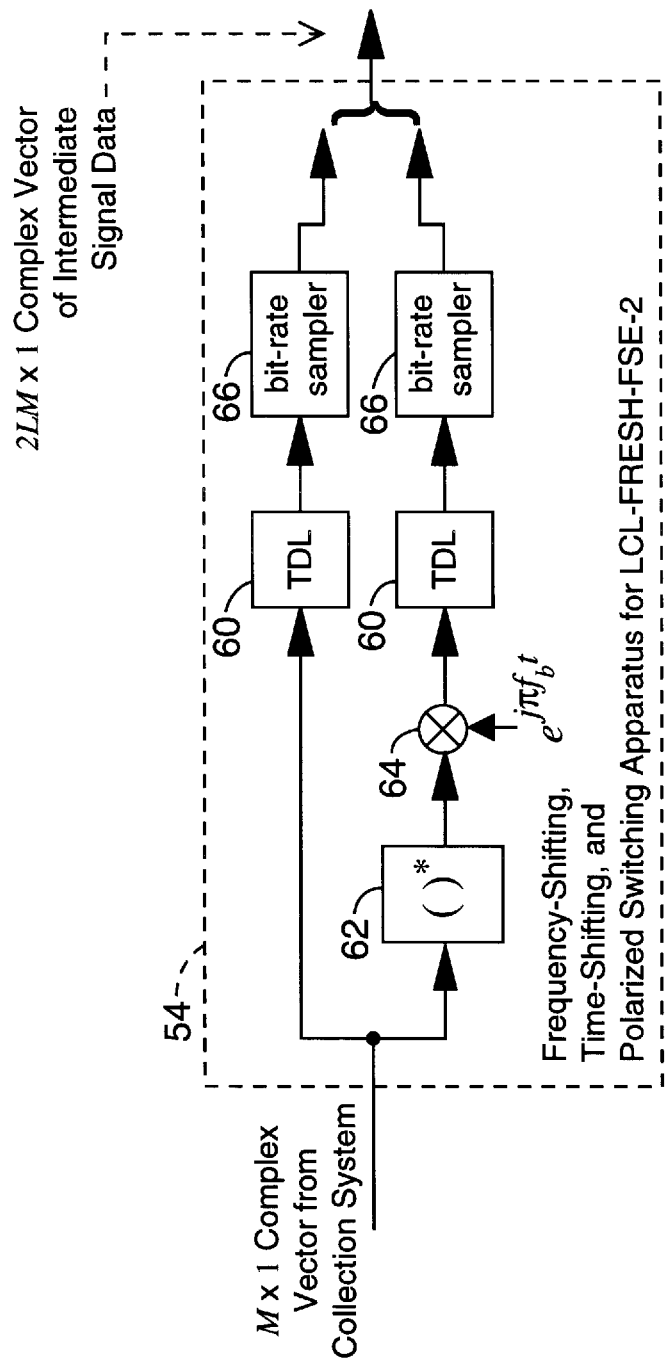
FIG. 27 is an alternative embodiment of the frequency-shifting, time-shifting, and polarized switching apparatus shown in FIG. 26 where the filter is configured as a type2 LCL-FRESH-FSE filter.
Figure 28:
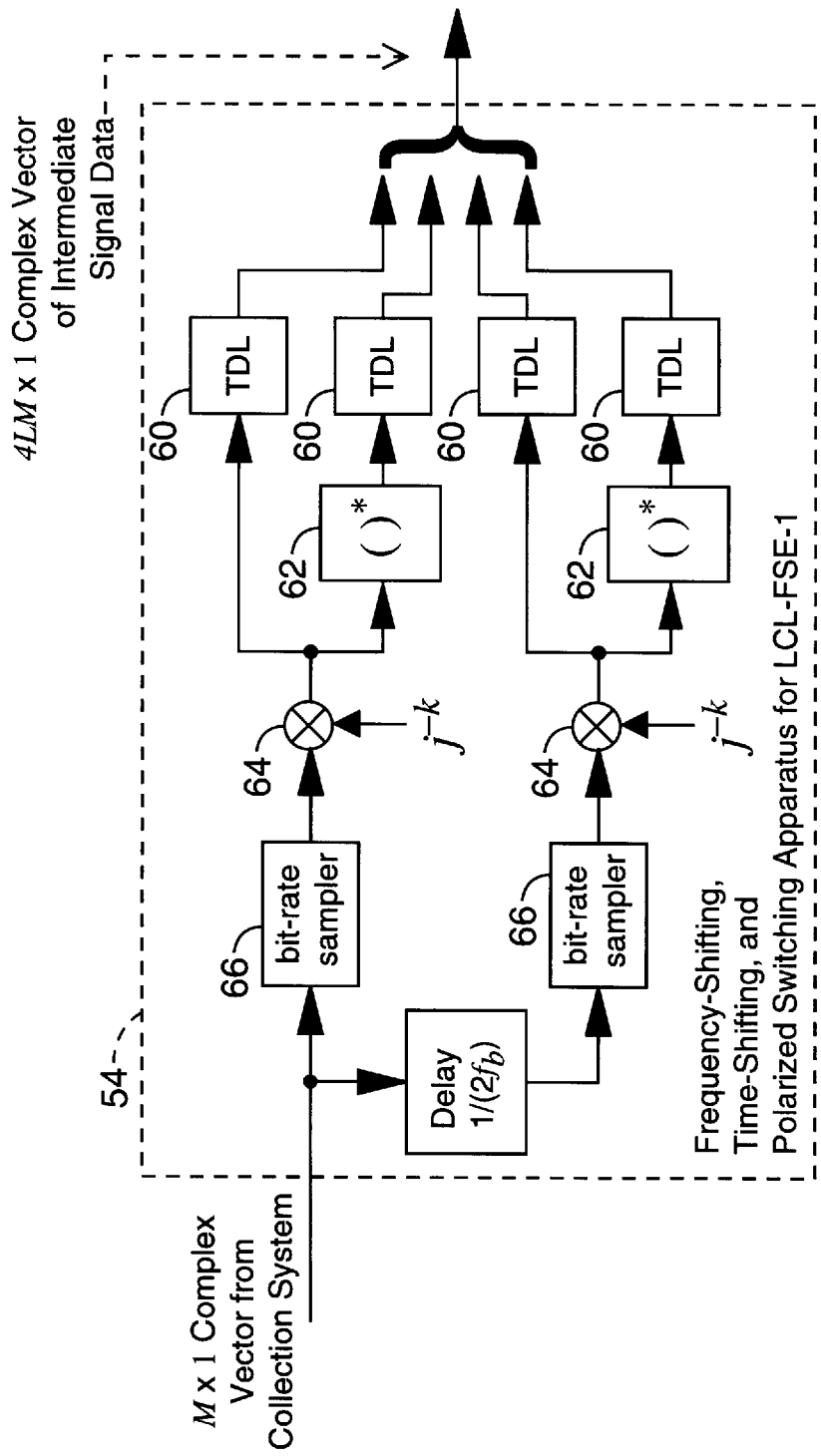
FIG. 28 is a functional block diagram of an embodiment of the frequency-shifting, time-shifting, and polarized switching apparatus block of the filter shown in FIG. 24 where the filter is configured as a type1 LCL-FSE filter.
Figure 29:
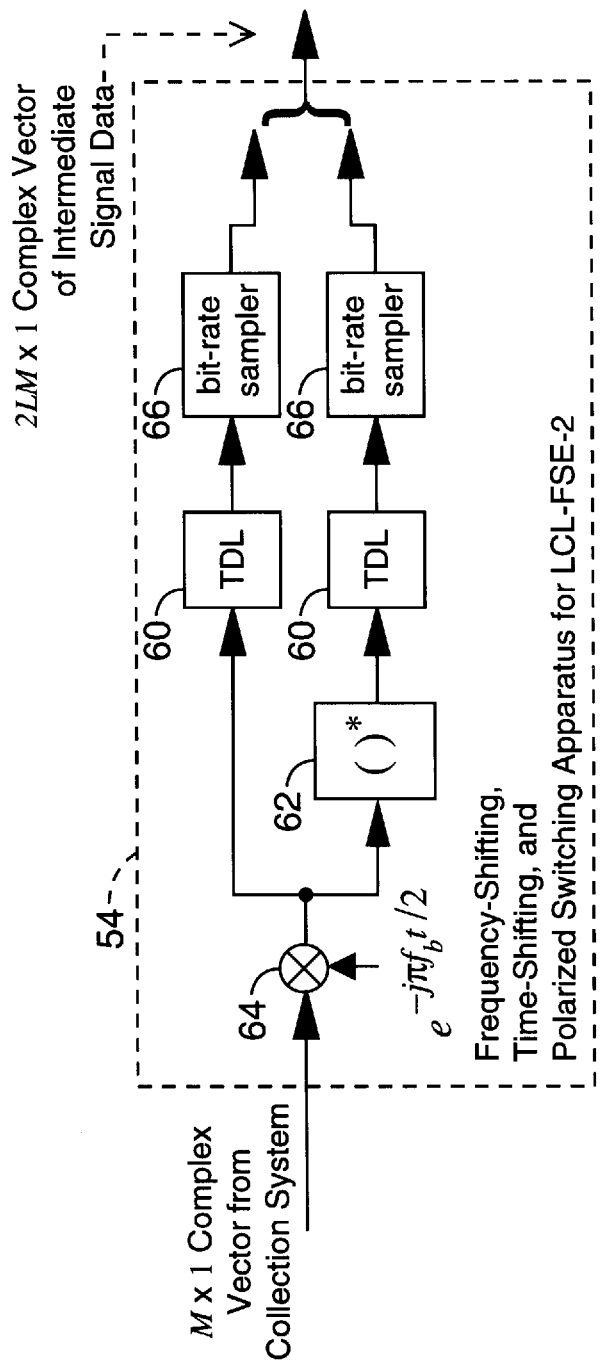
FIG. 29 is an alternative embodiment of the frequency-shifting, time-shifting, and polarized switching apparatus shown in FIG. 28 where the filter is configured as a type2 LCL-FSE filter.
Figure 30:
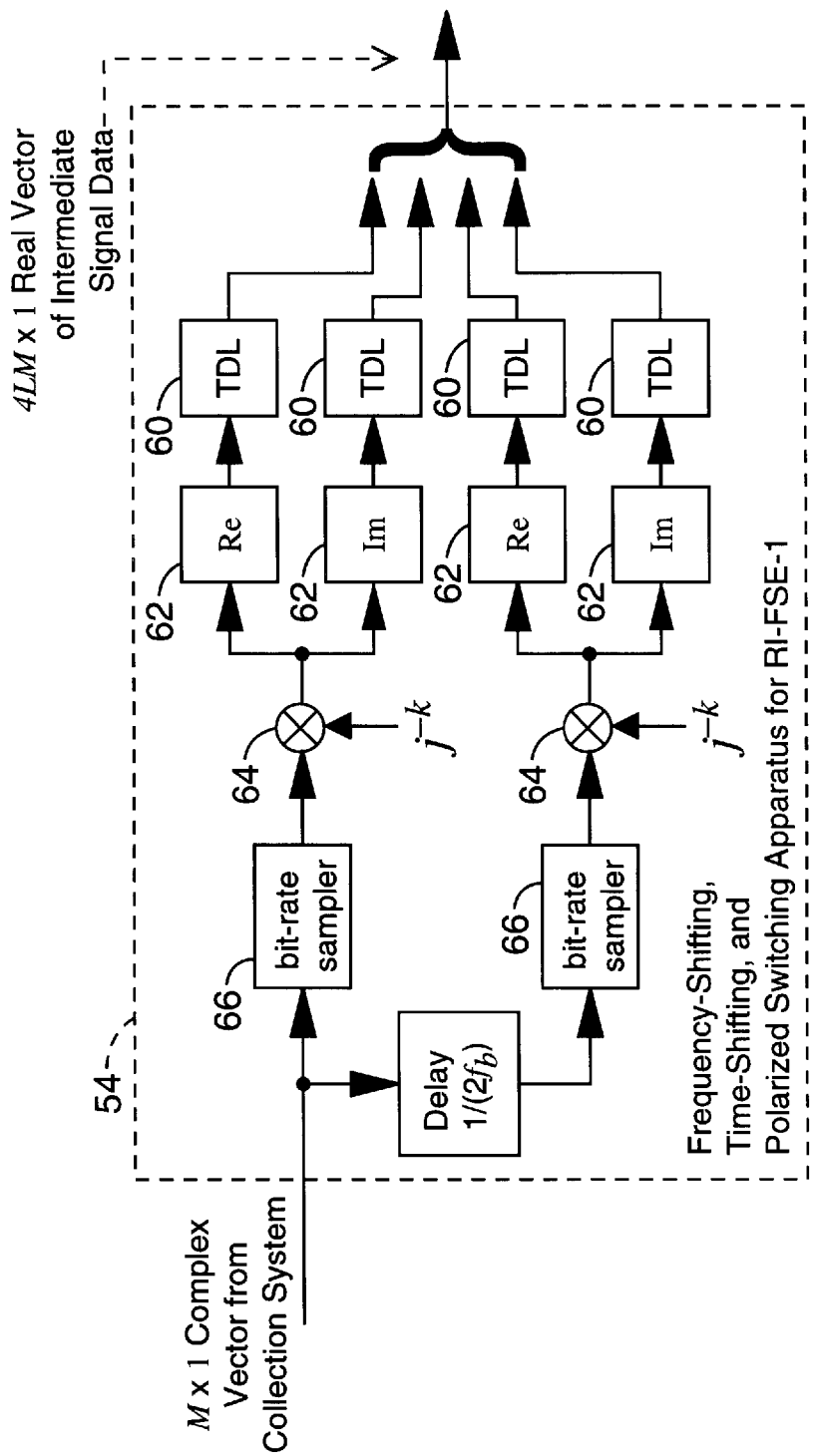
FIG. 30 is a functional block diagram of an embodiment of the frequency-shifting, time-shifting, and polarized switching apparatus block of the filter shown in FIG. 24 where the filter is configured as a type1 RI-FSE filter.
Figure 31:
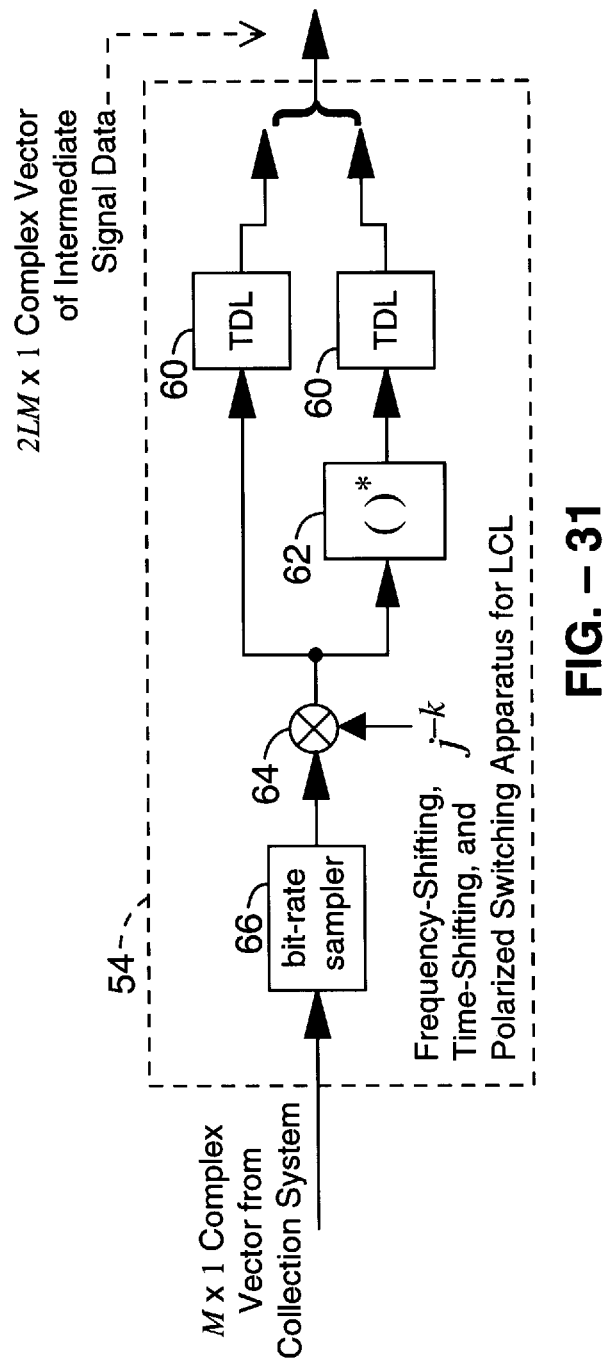
FIG. 31 is a functional block diagram of an embodiment of the frequency-shifting, time-shifting, and polarized switching apparatus block of the filter shown in FIG. 24 where the filter is configured as an LCL filter.
Figure 32:
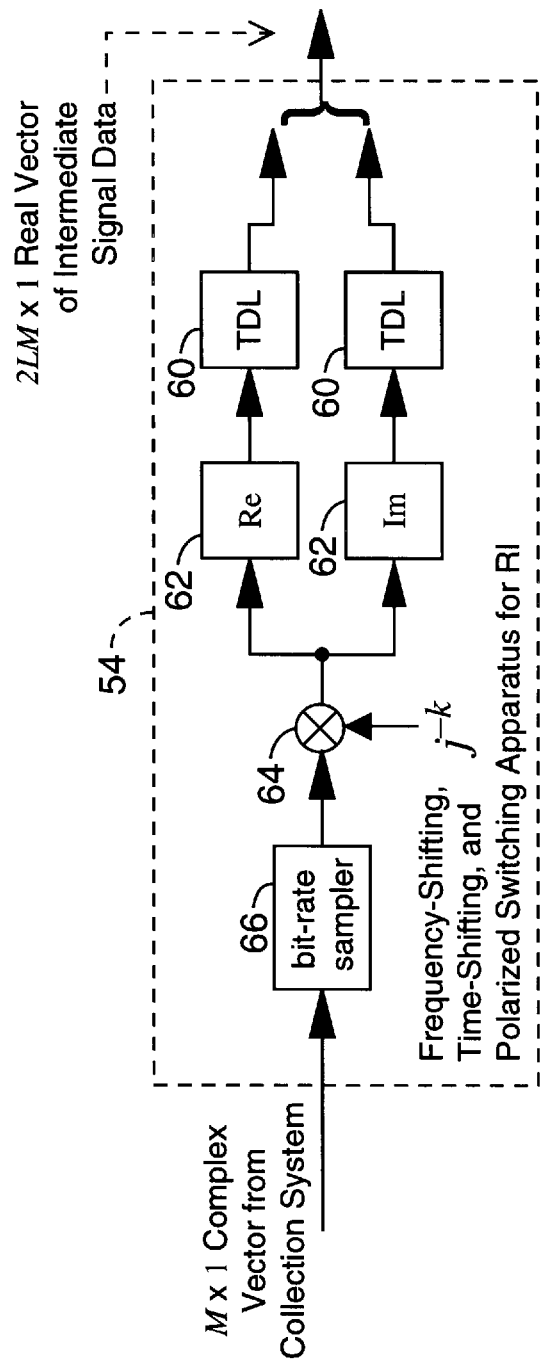
FIG. 32 is a functional block diagram of an embodiment of the frequency-shifting, time-shifting, and polarized switching apparatus block of the filter shown in FIG. 24 where the filter is configured as an RI filter.

A preferred embodiment of the Frequency-Shifting, Time-Shifting, and Polarized Switching Apparatus 54 is shown in FIG. 25 for the particular filtering structure corresponding to the 3-path LCL-FRESH filter described previously herein. It will be appreciated that the other filters previously described herein could be alternatively used. The apparatus accepts as an input the M×1 vector x(t) of received data and produces as an output the 3LM×1 vector y(t) according to Equation (4). The Tapped Delay Lines (TDL) 60 produce sets of L time-shifted versions of their respective inputs. The Polarized Switcher 62 which, in this embodiment is a conjugator, and the conjugator 62 and Frequency-Shifters 64 are depicted using standard block symbols from signal processing and communications. Similarly, the preferred embodiments of the Frequency-Shifting, Time-Shifting, and Polarized Switching Apparatus 54 for the particular filtering structures corresponding to the LCL-FRESH-FSE (2 alternate embodiments), the LCL-FSE (2 alternate embodiments), the RI-FSE (a second alternate embodiment can be obtained for the RI-FSE, similar to the LCL-FRESH-FSE and LCL-FSE), the LCL, and the RI filters are shown in FIG. 26 through FIG. 32, respectively, in which the intermediate signal vector at the output is 4LM×1 or 2LM×1. Note that the embedded training sequences that appear in the desired signal(s) must also be bit-rate sampled by a Bit-Rate Sampler 66 and frequency-shifted by $j^{-k}$ prior to using them in adaptation methods applied to the LCL-FSE, RI-FSE, LCL, and RI filters; it is similarly noted that this frequency shift $j^{-k}$ must be compensated for at the filter output by a conjugate frequency shift $j^{-k}$ if it is desired to obtain an unshifted estimate of the desired signal. However, many GMSK demodulators require their inputs to be shifted by $j^{-k}$ anyway, and so the conjugate frequency shift $j^k$ and the subsequent frequency shift $j^{-k}$ cancel each other. It is also noted that the RI-FSE and RI filters can be more efficiently implemented due to their use of real-valued intermediate signal vectors (and consequent arithmetic simplification of filter application and adaptation), instead of the complex-valued intermediate signal vectors that are used in the LCL-FSE and LCL filters.

Figure 33:
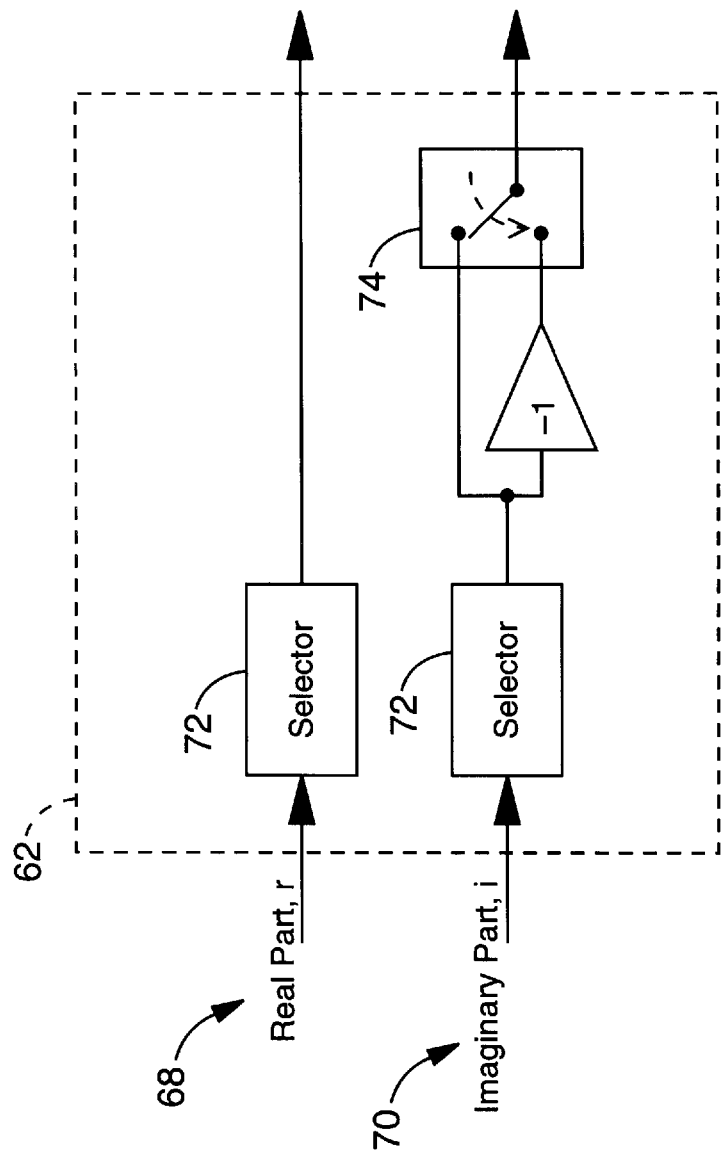
FIG. 33 is a functional block diagram depicting the polarized switch portion of the frequency-shifting, time-shifting, and polarized switching apparatus shown in FIG. 24 through FIG. 32.

Referring to FIG. 33, Polarized Switcher 62 is depicted in a functional block diagram form. It can be seen at this point that Polarized Switcher 62 represents a family of filter design parameters wherein the real 68 and imaginary 70 parts of the complex input signal are optionally selected or deselected by selectors 72 according to the conjugate cycle frequencies and input/output sampling rates shown in Table 1. Note also that the sign of the imaginary part of the input signal, if selected, is either unaffected or flipped by switch 74. In other words, the complex input signal is either conjugated, its real part is selected, or its imaginary part is selected. It will be appreciated, however, that Polarized Switcher 62 is preferably implemented as a single function conjugator or real-part selector or imaginary-part selector rather than an apparatus that provides for the alternative selection of each of those functions.

Figure 34:
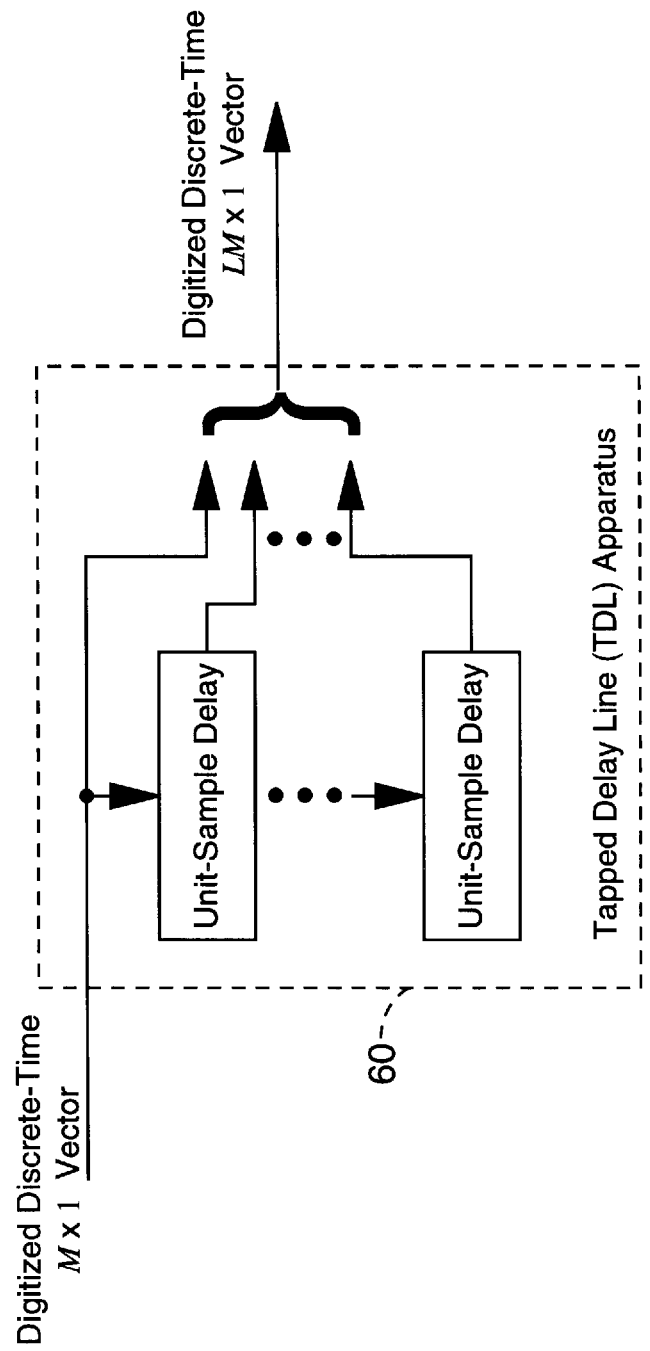
FIG. 34 is a functional block diagram of an embodiment of the tapped time delay (TDL) apparatus block of the frequency-shifting, time-shifting, and polarized switching apparatus shown in FIG. 25 through FIG. 32, where the input and output vectors can be real or complex.

Referring to FIG. 34, a preferred embodiment of the Tapped Delay Line (TDL) 60 is shown. This is a standard implementation of what is known in the art. The LM×1 output vector b(t) produced thereby is defined simply for any M×1 input vector a(t) to be $$b(t) = \begin{bmatrix} a(t) \\ a(t-1) \\ \vdots \\ a(t-L+1) \end{bmatrix}. \tag{19}$$

Thus, TDL 60 can accommodate either a real input or a complex input, with appropriate modification to the underlying unit-sample delay devices and signal paths.

Figure 35:
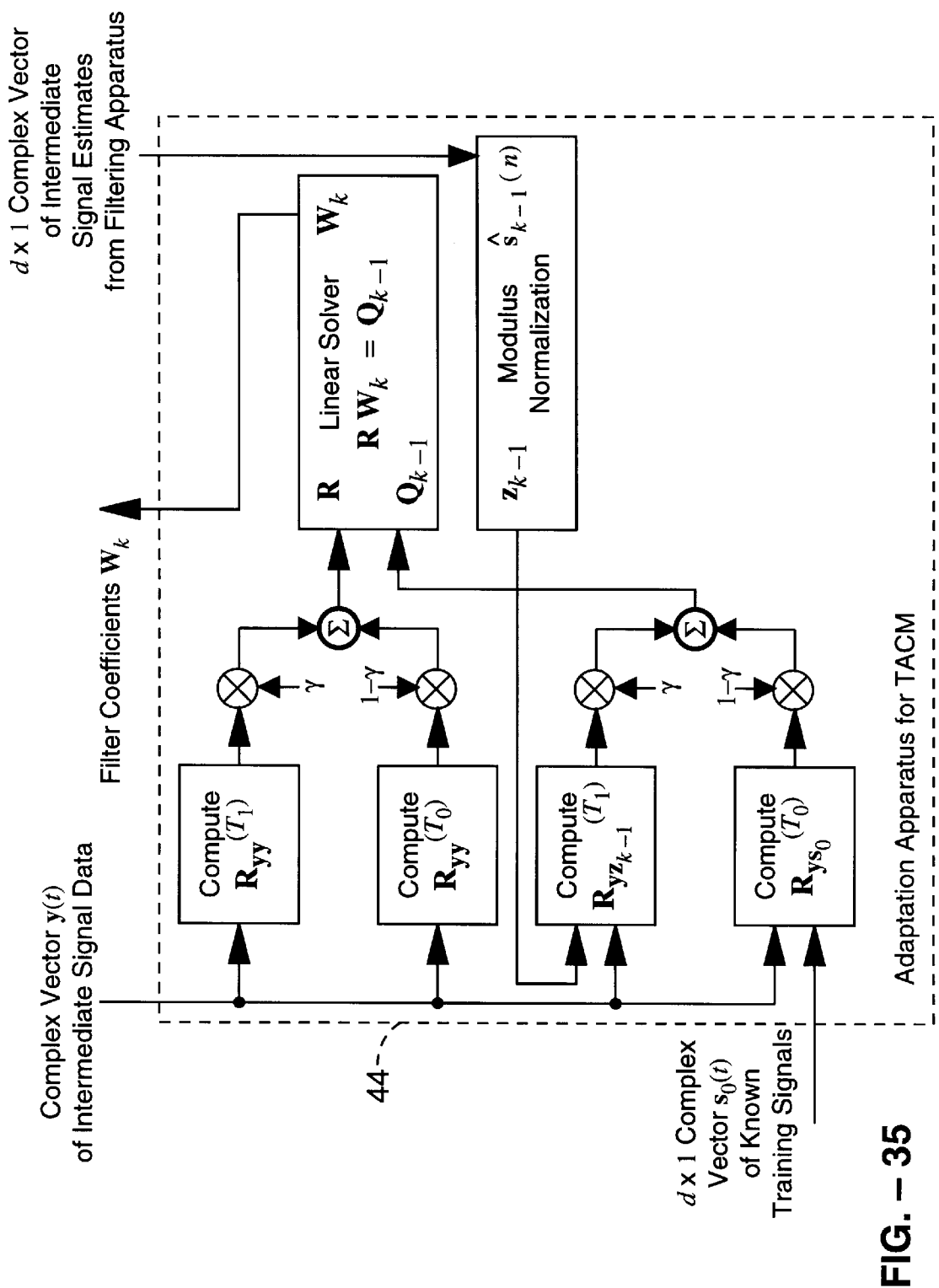
FIG. 35 is a functional block diagram of a TACM adaptation apparatus in accordance with the present invention.
Figure 36:
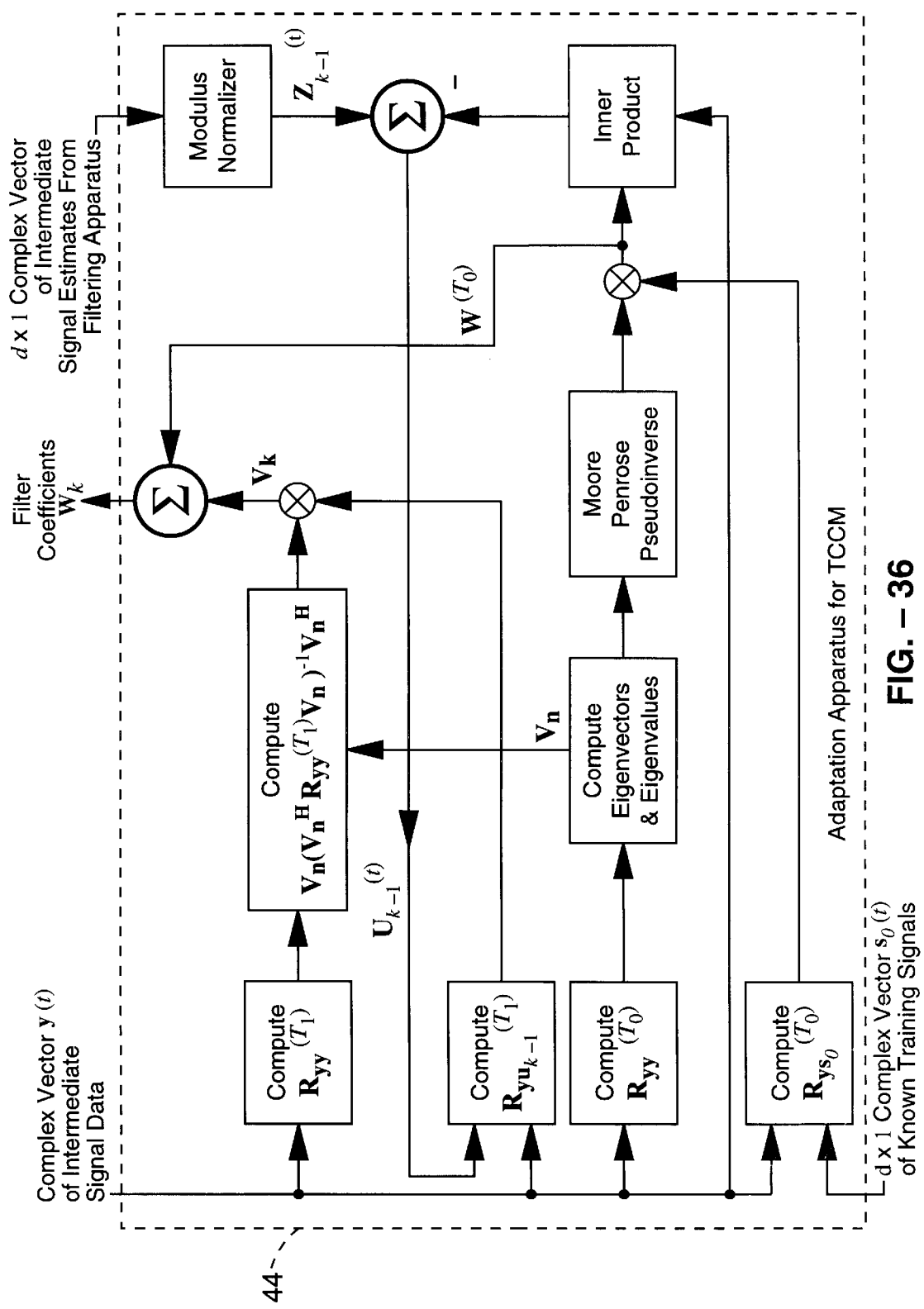
FIG. 36 is a functional block diagram of a TCCM adaptation apparatus in accordance with the present invention.

Referring now to FIG. 35 and FIG. 36, alternative embodiments of Adaptation Apparatus 44 are shown where TACM and TCCM are the chosen adaptation algorithms, respectively, and all of the d desired signals in the d×1 vector $s_0(t)$ have constant unit modulus. Adaptation Apparatus 44 takes as inputs the intermediate signal data y(t), provided by the signal buffer 56 in the Filtering Apparatus 42, and the output signal $\hat{s}_k(t)$ computed by the Matrix-Vector Multiplier 58 in the Filtering Apparatus 42. It provides as output the matrix $W_k$ of filter coefficients, and it also controls the output switch 46 shown in FIG. 22. Adaptation Apparatus 44 further moves the switch 46 from its lower position, in which Filtering Apparatus 42 output is directed to the Adaptation Apparatus 44, to its upper position, in which the Filtering Apparatus 42 output is the d×1 vector $\hat{s}(t)$ of desired signal estimates, suitable for subsequent use by an appropriate demodulator. It should be understood by those skilled in the art of implementing (e.g., on programmable digital signal processing chips) that alternate embodiments of the Adaptation Apparatus 44 follow directly from the descriptions of the various versions of TACM and TCCM in this document.

As can be seen, the present invention can be used to extract a signal of interest from a plurality of spectrally overlapping communications signals, separate and remove distortion from interfering co-channel signals and suppress adjacent-channel interfering signals of the GMSK or MSK type. These signals characteristically have real and imaginary components, exhibit spectral and temporal overlap, exhibit temporal redundancy, have conjugate cycle frequencies equal to twice their carrier frequencies plus and minus one-half of their data bit rate, and exhibit conjugate spectral redundancy for spectral components having frequencies separated by their conjugate cycle frequencies. The present invention provides for time-shifting, frequency-shifting, and conjugation or extraction of real or imaginary parts of complex signals, to produce an estimate of the signal of interest. While the description above contains many specificities, these should not be construed as limiting the scope of the invention but as merely providing illustrations of some of the presently preferred embodiments of this invention. Thus the scope of this invention should be determined by the appended claims and their legal equivalents.

We claim:

1. An apparatus for extracting a signal of interest from a plurality of spectrally and temporally overlapping input signals containing digital data having a bit rate, said input signals having carrier frequencies, said input signals having conjugate cycle frequencies equal to twice their carrier frequencies plus and minus one-half of their data bit rate, said input signals exhibiting conjugate spectral redundancy for spectral components having frequencies separated by said conjugate cycle frequencies, said input signals exhibiting temporal redundancy, said apparatus comprising:

(a) time-shifting means for producing a time-shifted output signal wherein said signal of interest is time-shifted;
   (b) frequency-shifting means for producing a frequency-shifted output signal wherein said signal of interest is frequency-shifted by an amount determined by its cycle frequencies; and
   (c) linear combining means for weighting and summing said output signals to produce an estimate of said signal of interest.

2. An apparatus as recited in claim 1, wherein said input signals having real and imaginary components, and further comprising polarized switching means for producing a polarized output signal wherein said real and/or imaginary components of said signal of interest are selected or deselected and wherein said real and imaginary components have signs which are changed or unchanged by said polarized switching means, wherein said polarized output signal is time-shifted, and wherein said polarized output signal is weighted and summed by said linear combining means.

3. An apparatus as recited in claim 1, further comprising receiving means for receiving said plurality of spectrally and temporally overlapping input signals.

4. An apparatus as recited in claim 1, further comprising demodulator means for extracting data from said estimate of said signal of interest.

5. An apparatus for extracting a signal of interest from a plurality of spectrally and temporally overlapping communications signals, said communications signals having real and imaginary components, said communications signals having carrier frequencies, said communications signals containing digital data having a bit rate, said communications signals exhibiting temporal redundancy, said communications signals having conjugate cycle frequencies equal to twice their carrier frequencies plus and minus one-half of their data bit rate, said communications signals exhibiting conjugate spectral redundancy for spectral components having frequencies separated by said conjugate cycle frequencies, said apparatus comprising:

(a) time-shifting means for producing a time-shifted output signal wherein said signal of interest is time-shifted;
   (b) polarized switching means for producing a polarized output signal wherein said real and/or imaginary components of said signal of interest are selected or deselected and wherein said real and imaginary components have signs which are changed or unchanged by said polarized switching means;
   (c) frequency-shifting means for producing a frequency-shifted output signal wherein said signal of interest is frequency-shifted by an amount determined by its cycle frequencies; and
   (d) linear combining means for weighting and summing said output signals to produce an estimate of said signal of interest.

6. An apparatus as recited in claim 5, further comprising receiving means for receiving said plurality of spectrally and temporally overlapping communications signals.

7. An apparatus as recited in claim 6, further comprising demodulator means for extracting data from said estimate of said signal of interest.

8. An apparatus for extracting a signal of interest from a plurality of spectrally and temporally overlapping communications signals containing digital data having a bit rate, said communications signals having carrier frequencies, said communications signals having conjugate cycle frequencies equal to twice their carrier frequencies plus and minus one-half of their data bit rate, said communications signals exhibiting conjugate spectral redundancy for spectral components having frequencies separated by said conjugate cycle frequencies, said communications signals exhibiting temporal redundancy, said apparatus comprising:

(a) sensor means for receiving said communications signals;
   (b) filter means for frequency-shifting, time-shifting and polarized switching of said signal of interest contained in said communications signals, wherein said signal of interest is frequency-shifted by an amount determined by its cycle frequencies;
   (c) means for adapting said filter means; and
   (d) means for producing an estimate of said signal of interest.

9. An apparatus as recited in claim 8, wherein said sensor means comprises an antenna and a radio frequency receiver.

10. An apparatus as recited in claim 9, further comprising signal buffering means for buffering an output signal from said filter means and producing and intermediate signal as an input to said adapter means.

11. An apparatus as recited in claim 10, further comprising matrix-vector multiplier means, coupled to said signal buffer means and said adapter means, for weighting and linearly combining signals from said filter means.

12. An apparatus as recited in claim 11, further comprising demodulator means for extracting digital data contained in said estimate of said signal of interest.

* * * * *

(12) EX PARTE REEXAMINATION CERTIFICATE (7990th)
United States Patent
Gardner et al.

(10) Number: US 5,848,105 C1
(45) Certificate Issued: Jan. 18, 2011

(54) GMSK SIGNAL PROCESSORS FOR IMPROVED COMMUNICATIONS CAPACITY AND QUALITY

(75) Inventors: William A. Gardner, Yountville, CA (US); Stephan V. Schell, Yountville, CA (US)

(73) Assignee: Apple Inc., Cupertino, CA (US)

Reexamination Request:
No. 90/010,971, Apr. 28, 2010

Reexamination Certificate for:
Patent No.: 5,848,105
Issued: Dec. 8, 1998
Appl. No.: 08/729,625
Filed: Oct. 10, 1996

(51) Int. Cl.
*H04L 27/22* (2006.01)
*H04L 25/03* (2006.01)

(52) U.S. Cl. .................. 375/336; 370/478; 375/346; 375/350

(58) Field of Classification Search .................. None
See application file for complete search history.

(56) References Cited

PUBLICATIONS

Gardner, Exploitation of Spectral Redundancy in Cyclostationary Signals, IEEE Signal Processing Magazine, Apr. 1991, vol. 8, No. 2, pp. 14–36. (Exhibit B).

Laurent, Exact and Approximate Construction of Digital Phase Modulations by Superposition of Amplitude Modulated Pulses (AMP), Feb. 1986, pp. 150–160, vol. Com–34, No. 2, IEEE Transactions on Communications (Exhibt C).

Kaleh, Simple Coherent Receivers for Partial Response Continuous Phase Modulation Journal, Dec. 1989, pp. 1427–1436, vol. 7, No. 9, IEEE Journal on Selected Areas in Communications (Exhibit D).

Gardner, Cyclic Wiener Filtering: Theory and Method, Jan. 1993, pp. 151–163, vol. 41, No. 1, IEEE Transactions on Communications (Exhibit E).

*Primary Examiner*—Deandra M Hughes

(57) ABSTRACT

A method and apparatus for separating and removing distortion from interfering co-channel signals and suppressing adjacent-channel interfering signals of the Gaussian Minimum-Shift Keyed (GMSK) or other MSK type with filtering structures that exploit the cyclostationarity of the received GMSK or other MSK signals in order to accommodate a greater number (or the same number, but with greater quality) of transmitted signals received by one or more antennas that can be accommodated by existing filters. The parameters in these filtering structures are adapted by either of two adaptation apparatus that exploit both the known training sequence that is transmitted in most wireless communications systems, and the constant modulus property exhibited by each of the transmitted GMSK or other MSK signals.

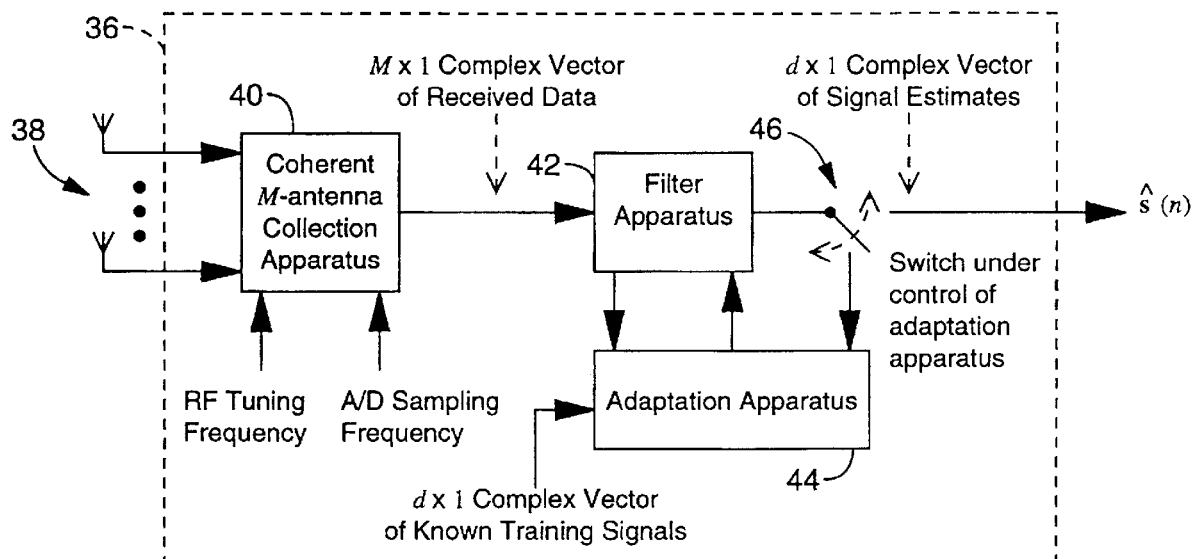

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1-12 is confirmed.

* * * * *